United States Patent
Sasaki

(10) Patent No.: US 8,624,854 B2
(45) Date of Patent: Jan. 7, 2014

(54) LIQUID CRYSTAL DISPLAY PANEL AND TOUCH PANEL

(75) Inventor: Kazuhiro Sasaki, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 368 days.

(21) Appl. No.: 12/827,243

(22) Filed: Jun. 30, 2010

(65) Prior Publication Data

US 2011/0001714 A1    Jan. 6, 2011

(30) Foreign Application Priority Data

Jul. 1, 2009   (JP) ................. 2009-157114

(51) Int. Cl.
G06F 3/041   (2006.01)
G09G 3/36    (2006.01)

(52) U.S. Cl.
USPC ........................................ 345/173; 345/104

(58) Field of Classification Search
USPC ............... 345/173, 174–178, 87–104; 178/18.01–18.09, 18.11
See application file for complete search history.

(56) References Cited

U.S. PATENT DOCUMENTS

| | | | |
|---|---|---|---|
| 7,046,282 B1 * | 5/2006 | Zhang et al. | 348/294 |
| 8,072,430 B2 | 12/2011 | Kim et al. | |
| 2007/0195029 A1 | 8/2007 | Jeon et al. | |
| 2008/0186288 A1 | 8/2008 | Chang | |
| 2009/0091546 A1 | 4/2009 | Joo et al. | |
| 2009/0303193 A1 | 12/2009 | Lim et al. | |
| 2011/0122084 A1 | 5/2011 | Jeon et al. | |

FOREIGN PATENT DOCUMENTS

| | | |
|---|---|---|
| CN | 1975517 A | 6/2007 |
| CN | 101038385 A | 9/2007 |
| JP | 2007-58070 A | 3/2007 |
| JP | 2007-95044 A | 4/2007 |
| JP | 2007-128091 A | 5/2007 |
| JP | 2008-191671 A | 8/2008 |
| JP | 2009-301545 A | 12/2009 |
| KR | 2008-0007812 A | 1/2008 |
| KR | 2009-0034482 A | 4/2009 |

OTHER PUBLICATIONS

Japanese Office Action dated Apr. 26, 2011 (and English translation thereof) in counterpart Japanese Application No. 2009-157114.
Korean Office Action dated Sep. 28, 2011 (and English translation thereof) in counterpart Korean Application No. 10-2010-0062128.
Chinese Office Action dated Feb. 1, 2012 (and English translation thereof) in counterpart Chinese Application No. 201010220839.8.

* cited by examiner

*Primary Examiner* — Stephen Sherman
(74) *Attorney, Agent, or Firm* — Holtz, Holtz, Goodman & Chick, PC

(57) ABSTRACT

A liquid crystal display panel includes a pixel electrode to apply a voltage to a liquid crystal layer disposed between the pixel electrode and an opposed electrode, a thin film transistor connected to the pixel electrode, a scanning line to supply a gate signal to the thin film transistor, a first coordinate detection line disposed parallel to the scanning line, a first coordinate detection electrode formed closer to the liquid crystal layer than the scanning line and the first coordinate detection line, and a first insulating film formed as a layer between the first coordinate detection line and the first coordinate detection electrode. The first insulating film is provided with a contact hole to electrically connect the first coordinate detection line and the first coordinate detection electrode.

22 Claims, 20 Drawing Sheets

FIG. 14

LIQUID CRYSTAL DISPLAY PANEL AND TOUCH PANEL

CROSS-REFERENCE TO RELATED APPLICATIONS

This application is based upon and claims the benefit of priority from prior Japanese Patent Application No. 2009-157114, filed Jul. 1, 2009, the entire contents of which are incorporated herein by reference.

BACKGROUND OF THE INVENTION

1. Field of the Invention

This invention relates to a liquid crystal display panel and a touch panel.

2. Description of the Related Art

A liquid crystal display panel having a touch panel function is known (e.g., Jpn. Pat. Appln. KOKAI Publication No. 2007-95044 and Jpn. Pat. Appln. KOKAI Publication No. 2007-58070).

The conventional liquid crystal display panel having the touch panel function has the following configuration: Electrodes are provided on opposite surfaces of first and second substrates arranged across a liquid crystal layer. These electrodes serve to form pixels for controlling the alignment of liquid crystal molecules by the application of a voltage and thereby controlling the transmission of light. X-coordinate detection lines and Y-coordinate detection lines are provided on the surface of the first substrate in accordance with regions between the pixels. The X-coordinate detection lines serve to detect coordinates of a touched point in an X direction intersecting with a Y direction. The Y-coordinate detection lines serve to detect coordinates of the touched point in the Y direction. Coordinate detection electrodes are provided between one or both of the X-coordinate detection line and Y-coordinate detection line and the pixel electrode adjacent thereto. These coordinate detection electrodes are provided to be connected to each of the X-coordinate detection lines and each of the Y-coordinate detection lines. Contact portions are provided on the surface of the second substrate to face the coordinate detection electrodes. These contact portions flexibly deform and come into contact with the coordinate detection electrodes when the outer surface of the liquid crystal panel is touched.

However, in the conventional liquid crystal display panel having the touch panel function, since arrangement space for the coordinate detection electrodes must be allocated between one or both of the X-coordinate detection lines and the Y-coordinate detection lines and each pixel electrode, each pixel electrode adjacent to the arrangement portion of the contact electrodes must be formed to be greatly apart from the coordinate detection lines. Thus, an area of each pixel electrode adjacent to the arrangement portion of the contact electrodes is considerably small, thereby greatly reducing an aperture ratio of a pixel corresponding to this pixel electrode.

BRIEF SUMMARY OF THE INVENTION

An object of the present invention is to provide a liquid crystal display panel and a liquid crystal display panel in which each pixel electrode adjacent to the arrangement portions of the coordinate detection electrodes can be formed with a sufficient area, so that a reduction in aperture ratio of a pixel corresponding to this pixel electrode is decreased.

According to an aspect of embodiments, a liquid crystal display panel includes a pixel electrode to apply a voltage to a liquid crystal layer disposed between the pixel electrode and an opposed electrode; a thin film transistor connected to the pixel electrode; a scanning line to supply a gate signal to the thin film transistor; a first coordinate detection line disposed parallel to the scanning line; a first coordinate detection electrode formed closer to the liquid crystal layer than the first coordinate detection line, the first coordinate detection electrode being formed in a region overlapping the first coordinate detection line; and a first insulating film formed as a layer between the first coordinate detection line and the first coordinate detection electrode, the first insulating film being provided with a contact hole to electrically connect the first coordinate detection line and the first coordinate detection electrode.

According to another aspect of embodiments, a touch panel includes a pixel electrode to apply a voltage to a liquid crystal layer disposed between the pixel electrode and an opposed electrode; a thin film transistor connected to the pixel electrode; a scanning line to supply a gate signal to the thin film transistor; a first coordinate detection line disposed parallel to the scanning line; a first coordinate detection electrode formed closer to the liquid crystal layer than the first coordinate detection line, the first coordinate detection electrode being formed in a region overlapping the first coordinate detection line; a first insulating film formed as a layer between the first coordinate detection line and the first coordinate detection electrode, the first insulating film being provided with a contact hole to electrically connect the first coordinate detection line and the first coordinate detection electrode; a first substrate on which the pixel electrode is formed; a second substrate on which the opposed electrode is formed; and a convex portion formed on the second substrate to face the first coordinate detection electrode and to protrude from the second substrate toward the first substrate, the convex portion electrically connecting the first coordinate detection electrode to the opposed electrode when the second substrate is pressed.

According to still another aspect of embodiments, a touch panel includes a pixel electrode to apply a voltage to a liquid crystal layer disposed between the pixel electrode and an opposed electrode; a thin film transistor connected to the pixel electrode; a scanning line to supply a gate signal to the thin film transistor; a first coordinate detection line disposed parallel to the scanning line; a first coordinate detection electrode formed closer to the liquid crystal layer than the first coordinate detection line, the first coordinate detection electrode being formed in a region overlapping the first coordinate detection line; a first insulating film formed as a layer between the first coordinate detection line and the first coordinate detection electrode, the first insulating film being provided with a contact hole to electrically connect the first coordinate detection line and the first coordinate detection electrode; a first substrate on which the pixel electrode is formed; a second substrate on which the opposed electrode is formed; and a convex portion that is formed between the second substrate and the opposed electrode so that a region of the opposed electrode facing the first coordinate detection electrode is located closer to the first substrate than a region of the opposed electrode facing the pixel electrode.

According to the present invention, each pixel electrode adjacent to the arrangement portions of the coordinate detection electrodes can be formed with a sufficient area, so that a reduction in aperture ratio of a pixel corresponding to this pixel electrode is decreased.

Advantages of the invention will be set forth in the description which follows, and in part will be obvious from the description, or may be learned by practice of the invention.

The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14 is a waveform chart for the driving signals and the signals of the touched-point coordinate detection system when driving in accordance with the frame inversion scheme;

DETAILED DESCRIPTION OF THE INVENTION

First Embodiment

Figure 1:
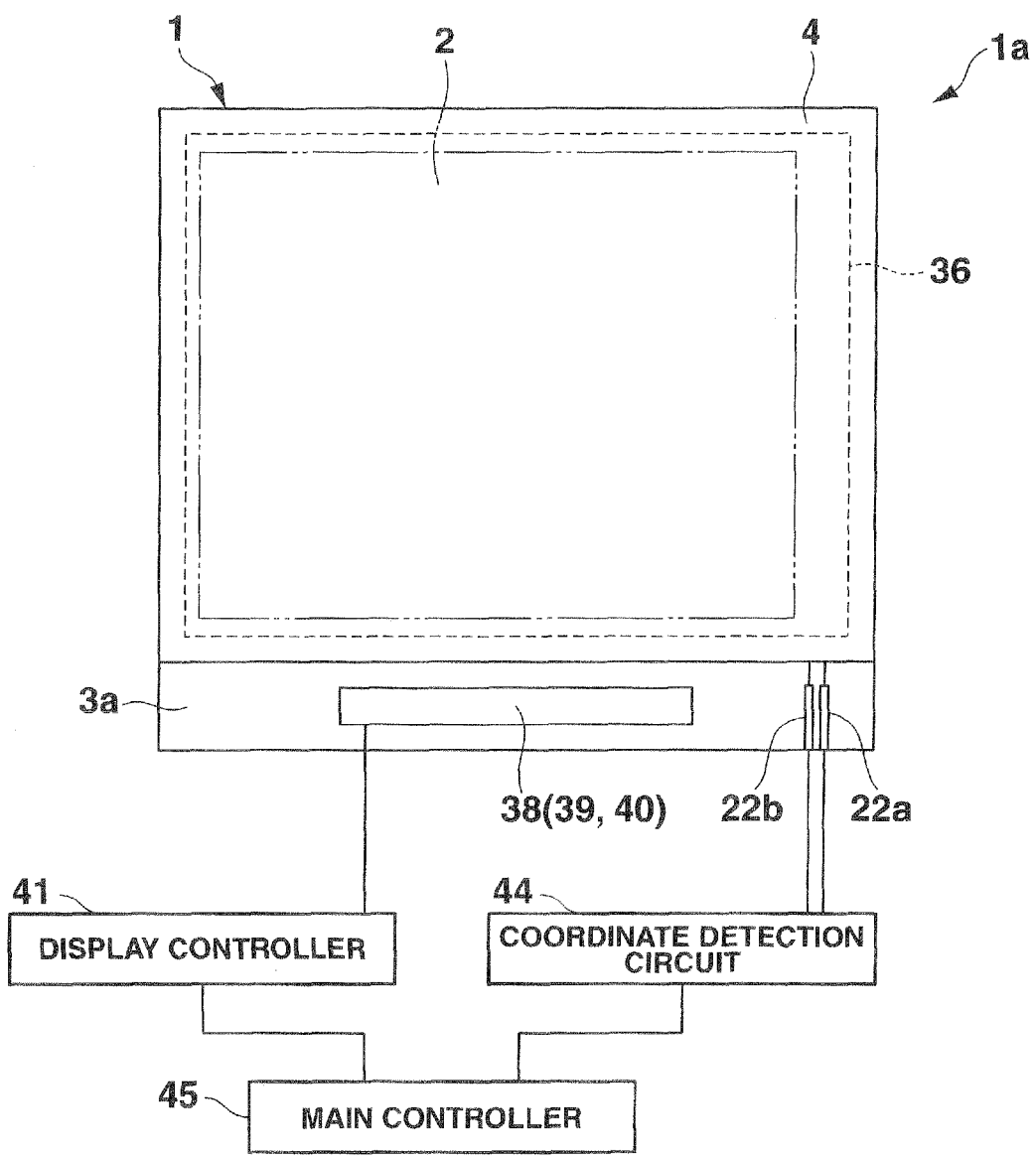
FIG. 1 is a plan view of a liquid crystal display device according to a first embodiment.

A plan view of a liquid crystal display device is shown in FIG. 1. The liquid crystal display device comprises a liquid crystal display panel 1 having a touch panel function, a driver element 38 mounted on the liquid crystal display panel 1, a display controller 41, a coordinate detection circuit 44, and a main controller 45. That is, the liquid crystal display panel 1 is a display element for displaying images and is also a touch panel for detecting a point pressed by a user.

The liquid crystal display panel 1 is an active matrix type liquid crystal display panel that uses, as active elements, pixel transistors (hereinafter referred to as pixel TFTs) 6 configured by thin film transistors. Further, pixel electrodes 5 connected to the pixel TFTs 6 is disposed to face an opposed electrode 16 through a liquid crystal layer 37 per each pixel. Voltages between the pixel electrodes 5 and the opposed electrode 16 are controlled, so that alignment directions of liquid crystal molecules in the liquid crystal layer 37 change.

As shown in FIGS. 1 to 9, the liquid crystal display panel 1 includes a first transparent substrate 3 and a second transparent substrate 4 facing each other across the liquid crystal layer 37. The first substrate (hereinafter referred to as a rear substrate) 3 is provided with, on its surface facing the second substrate (hereinafter referred to as a front substrate) 4, the pixel electrodes 5, the pixel TFTs 6, scanning lines 14, and signal lines 15. The pixel electrodes 5 are transparent and formed to be arranged in a row direction and a column direction in a predetermined screen area 2. The pixel TFTs 6 are arranged to correspond to the pixel electrodes 5, and are connected to the corresponding pixel electrodes 5. The scanning lines 14 extend parallel to one another to correspond to the rows of the pixel electrodes 5, and are for supplying the pixel TFTs 6 with on-signals to turn on the corresponding pixel TFTs 6 for a predetermined period, that is, gate signals. The signal lines 15 are extend parallel to one another to correspond to the columns of the pixel electrodes 5, and are for supplying the corresponding pixel TFTs 6 with a data signal. The second substrate (hereinafter referred to as a front substrate) 4 is provided with, on its surface facing the rear substrate 3, the opposed electrode 16, a light-shielding film 17, and red, green, and blue color filters 18R, 18G, 18B. The opposed electrode 16 are single-film-like and transparent and faces the pixel electrodes 5. The light-shielding film 17 corresponds to a region between the pixels where the pixel electrodes 5 face the opposed electrode 16. The color filters 18R, 18G, 18B are formed to correspond to the pixels. Here, more specifically, the scanning lines 14 are arranged to extend parallel to one another, and are for supplying, as the gate signals, the on-signals to turn on the corresponding pixel TFTs 6 for a predetermined period, from a scan driver 39 to the pixel TFTs 6.

Furthermore, this liquid crystal display panel 1 has the touch panel function. This touch panel function is enabled by the following configuration: The rear substrate 3 are provided with, on its surface facing the front substrate 4, X-coordinate detection lines (second coordinate detection lines) 19, Y-coordinate detection lines (first coordinate detection lines) 20, X-coordinate detection electrodes (second coordinate detection electrodes) 25, and Y-coordinate detection electrodes (first coordinate detection electrodes) 26. The X-coordinate detection lines 19 extend perpendicularly to the scanning lines 14 in order to detect, as X coordinates, first coordinates in the direction of the scanning lines 14 out of coordinates of a touched point. The Y-coordinate detection lines 20 extend perpendicularly to the extending direction of the X-coordinate detection lines 19 in order to detect, as Y coordinates, second coordinates of the touched point in the direction of the signal lines 15. The X-coordinate detection electrodes 25 are arranged to be connected to the X-coordinate detection lines 19. The Y-coordinate detection electrodes 26 are arranged to be connected to the Y-coordinate detection lines 20. Further, contact portions 31 are formed in parts of the opposed electrode 16 in the front substrate 4 that face the places where the X-coordinate detection electrodes 25 and the Y-coordinate detection electrodes 26 are arranged. When touched from the outer side of the front substrate 4 and thus flexibly deformed, the contact portion 31 comes into contact with both the X-coordinate detection electrode 25 and the Y-coordinate detection electrode 26.

It is to be noted that each pixel electrode 5 is formed into a vertically long rectangular shape in which an electrode width in the row direction is smaller than an electrode width in the column direction. Each pixel TFT 6 is arranged on one end edge (a lower end edge in FIG. 3) side of each pixel electrode 5 formed into the vertically long rectangular shape in the column direction. Each scanning line 14 is provided along an end edge of the pixel electrode 5 in each row on the side where the pixel TFT 6 is arranged. Each signal line 15 is provided along one side edge (a left side edge in FIG. 3) of the pixel electrode 5 in each column in the row direction.

Moreover, each light shielding film 17 is formed of a laminated film including, e.g., chrome and a chrome oxide, the three color filters 18R, 18G and 18B of red, green and blue are formed into a stripe shape on the surface of the front substrate 4 where the light shielding films 17 are formed corresponding to the respective pixel electrode columns, and the opposed electrode 16 is formed on these color filters 18R, 18G and 18B.

The liquid crystal display panel 1 according to this embodiment is to detect a touch point coordinate in the direction of the scanning lines 14 as an X coordinate and to detect a touch point coordinate in the direction of the signal lines 15 as a Y coordinate. Each X coordinate detection line 19 is formed between the pixel electrodes 5 in the central column in respective columns of the pixels and the signal line 15 adjacent to this column of the pixel electrodes 5 to be substantially parallel to the signal line 15. Each Y coordinate detection line 20 is formed between the pixel electrodes 5 in each row of the pixels and the scanning line 14 adjacent to this row of the pixel electrodes 5 to be substantially parallel to the scanning line 14. Each contact portion 31 is formed to be electrically conductive with respect to the opposed electrode 16.

It is to be noted that each X coordinate detection line 19 is formed between the pixel electrodes 5 in the central column in each pixel column and the signal line 15 through which data signals are supplied to the pixel TFTs 6 connected with the respective pixel electrodes 5 in the side column in the pixel column. Each Y coordinate detection line 20 is provided between the pixel electrodes 5 in each pixel row and the scanning line 14 through which a gate signal is supplied to the pixel TFTs 6 connected with the respective pixel electrodes 5 in a pixel row adjacent to the former pixel row.

Further, each X coordinate detection line 19 is insulated from each Y coordinate detection line 20. On one or both of each X coordinate detection line 19 and each Y coordinate detection line 20 of an insulating film (a later-described overcoat film 23 or a two-layer film including a gate insulating film 8 of the pixel TFT 6 and the overcoat insulating film 23 in this embodiment) provided to cover each X coordinate detection line 19 and each Y coordinate detection line 20, the X coordinate detection electrode 25 to detect a touch point coordinate in the X direction and the Y coordinate detection electrode 26 to detect a touch point coordinate in the Y direction are arranged so that the X coordinate detection electrode 25 is connected with the X coordinate detection line 19 in a first contact hole 29 provided in the insulating film and the Y coordinate detection electrode 26 is connected with the Y coordinate detection line 20 in a second contact hole 30 provided in the insulating film.

The overcoat insulating film is configured by, for example, an insulating film such as a silicon oxide film and a silicon nitride film, and the gate insulating film is configured by, for example, an insulating film such as a silicon oxide film and a silicon nitride film.

Furthermore, the X coordinate detection electrode 25 and the Y coordinate detection electrode 26 are arranged to be adjacent to each other near each line intersecting portion where each X coordinate detection line 19 crosses each Y coordinate detection line 20. Each contact portion 31 is formed into a shape that it comes into contact with both the X coordinate detection electrode 25 and the Y coordinate detection electrode 26 adjacent to each other to face each arrangement portion of the X coordinate detection electrode 25 and the Y coordinate detection electrode 26 adjacent to each other.

Moreover, this liquid crystal display panel 1 includes first detection transistors (which will be referred to as X coordinate detection TFTs hereinafter) 6a configured by thin-film transistors and second detection transistors (which will be referred to as Y coordinate detection TFTs hereinafter) 6b configured by thin-film transistors, both of which arranged in a region other than the screen area 2 of the rear substrate 3. Each X coordinate detection TFT 6a and each Y coordinate detection TFT 6b are arranged in a region (a region on a right-hand side of the screen area 2 in FIG. 1) other than the screen area of each scanning line 14 and each Y coordinate detection line 20 on one end side.

Each of the X coordinate detection TFT 6a and the Y coordinate detection TFT 6b has a laminated structure equal to that of the pixel TFT 6. That is, each of the pixel TFT 6, the X coordinate detection TFT 6a and the Y coordinate detection TFT 6b includes a gate electrode 7 formed on the rear substrate 3, a transparent gate insulating film 8 formed to cover the gate electrode 7, an i-type semiconductor film 9 formed to face the gate electrode 7 on the gate insulating film 8, a blocking insulating film 10 formed on a channel region of the i-type semiconductor film 9, and a source electrode 12 and a drain electrode 13 formed on both side portions sandwiching the channel region of the i-type semiconductor film 9 through an n-type semiconductor film 11.

Furthermore, each scanning line 14 and each Y coordinate detection line 20 are formed of the same metal film as the gate electrode 7 of each TFT 6, 6a or 6b for display, X coordinate detection and Y coordinate detection on the rear substrate 3, for example aluminum, chromium, molybdenum, or the like. The gate insulating film 8 of each TFT 6, 6a or 6b is formed on substantially the entire rear substrate 3 to cover each scanning line 14 and each Y coordinate detection line 20. Each signal line 15 and each X coordinate detection line 19 is formed of the same metal film as the source electrode 12 and the drain electrode 13 of each TFT 6, 6a or 6b on the gate insulating film 8, for example aluminum, chromium, molybdenum, or the like.

That is, each Y coordinate detection line 20 is formed on the rear substrate 3, and each X coordinate detection line 19 is formed to be insulated from each Y coordinate detection line 20 by the gate insulating film 8 that is provided to cover each Y coordinate detection line 20.

Moreover, an overcoat insulating film 23 is provided on the gate insulating film 8 to cover each TFT 6, 6a or 6b, each signal line 15 and each X coordinate detection line 19. Each pixel electrode 5 is formed on the overcoat insulating film 23 so that one end portion of each pixel electrode 5 faces the drain electrode 13 of each pixel TFT 6, and connected with the drain electrode 13 of the pixel TFT 6 in a contact hole 24 provided in the overcoat insulating film 23.

Although not shown in the drawing, on the rear substrate 3, a capacitance electrode that faces a peripheral portion of each pixel electrode 5 except a connecting portion with respect to the pixel TFT 6 through the gate insulating film 8 and the overcoat insulating film 23 and forms a compensation capacitance between itself and the peripheral portion of each pixel electrode 5 is formed of the same metal film as the gate electrode 7, each scanning line 14 and each Y coordinate detection line 20, for example aluminum, chromium, molybdenum, or the like.

Additionally, the X coordinate detection electrode 25 and the Y coordinate detection electrode 26 are formed on the overcoat insulating film 23 provided to cover each X coordinate detection line 19.

In this embodiment, each of the X coordinate detection electrode 25 and the Y coordinate detection electrode 26 is formed at a portion that covers the Y coordinate detection line 20 near each line intersecting portion where each X coordinate detection line 19 crosses each Y coordinate detection line 20 so that an end portion of the X coordinate detection electrode 25 on the opposite side of the side neighboring the Y coordinate detection electrode 26.

It is to be noted that the X coordinate detection electrode 25 and the Y coordinate detection electrode 26 are provided in a portion adjacent to each pixel electrode 5 facing the blue filter 18B on the Y coordinate detection line 20.

Further, in this embodiment, a basal portion 27 formed into the same laminated structure as the respective TFTs 6, 6a and 6b for display, X coordinate detection and Y coordinate detection and the overcoat insulating film 23 provided thereon is formed on the rear substrate 3 corresponding to a region where each contact portion 31 of the X coordinate detection electrode 25 and the Y coordinate detection electrode 26 provided on the front substrate 4 comes into contact, and the X coordinate detection electrode 25 and the Y coordinate detection electrode 26 are formed on this basal portion 27.

The basal portion 27 is formed into the same laminated structure as the laminated structure including the overcoat insulating film 23 of each TFT 6, 6a or 6b for display, X coordinate detection or Y coordinate detection. That is, the basal portion 27 is formed of the Y coordinate detection line 20, the gate insulating film 8 provided to cover the Y coordinate detection line 20, the same three-layer film as the i-type semiconductor film 9, the blocking insulating film 10 and the n-type semiconductor film 11 of each TFT 6, 6a or 6b, an upper metal film 28 formed of the same metal film as the source electrode 12 and the drain electrode 13, and the overcoat insulating film 23.

Furthermore, each of the X coordinate detection electrode 25 and the Y coordinate detection electrode 26 is formed on the basal portion 27, i.e., a portion that covers the Y coordinate detection line 20 on the overcoat insulating film 23 so that the end portion of the X coordinate detection electrode 25 on the opposite side of the side adjacent to the Y coordinate detection electrode 26 faces the line intersecting portion. In the contact electrodes 25 and 26, the end portion of the X coordinate detection electrode 25 on the opposite side is connected with the X coordinate detection line 19 in the first contact hole 29 provided in the overcoat insulating film 23. The end portion of the Y coordinate detection electrode 26 on the opposite side of the side adjacent to the X coordinate detection electrode 25 is connected with the Y coordinate detection line 20 in the second contact hole 30 provided in the overcoat insulating film 23 and the gate insulating film 8.

It is to be noted that, in this embodiment, the basal portion 27 is formed at a portion facing the adjoining end portions of the X coordinate detection electrode 25 and the Y coordinate detection electrode 26, and hence a portion other than the adjoining end portions of the X coordinate detection electrode 25 and the Y coordinate detection electrode 26 is lower than the adjoining end portions.

The respective TFTs 6, 6a and 6b and the basal portion 27 are formed in a process of simultaneously forming the gate electrode 7 and the Y coordinate detection line 20 based on formation of a gate metal film on the rear substrate 3 and its patterning, sequentially forming the gate insulating film 8, the i-type semiconductor film 9 and the blocking insulating film 10, patterning the blocking insulating film 10, then sequentially forming the n-type semiconductor film 11 and the source and drain metal films, and collectively patterning the source and drain metal films, the n type semiconductor film 11 and the i-type semiconductor film 9 into shapes of the source electrode 12 and the drain electrode 13 of each TFT 6, 6a or 6b, the X coordinate detection line 19 and the upper metal film 28 of the basal portion 27. Therefore, the i-type semiconductor film 9 an the n-type semiconductor film 11 are also present below each signal line 15 and each X coordinate detection line 19. It is to be noted that the i-type semiconductor film 9 an the n-type semiconductor film 11 are formed of amorphous silicon or polysilicon.

Moreover, each X coordinate detection line 19 is provided in accordance with each of predetermined pixel electrode columns, and each Y coordinate detection line 20 is provided in accordance with each of predetermined pixel electrode rows. It is to be noted that, in the liquid crystal display panel 1 according to this embodiment, the number of the pixel electrode rows is larger than the number of the pixel electrode columns. In this embodiment, each Y coordinate detection line 20 is provided in accordance with each of all the rows of the pixel electrodes 5, and the X coordinate detection lines 19 equal to the Y coordinate detection lines in number are provided every predetermined number, e.g., every three pixel electrode columns (per each pixel electrode facing the blue filter 18B in three colors, i.e., red, green and blue in FIGS. 2 and 3) in the columns of the pixel electrodes 5.

Additionally, the X coordinate detection TFT 6a and the Y coordinate detection TFT 6b are arranged in a region other than the screen area of the rear substrate 3 for each of the scanning lines (all the scanning lines in this embodiment) 14 equal to the Y coordinate detection lines 20 in number so that one X coordinate detection TFT 6*a* and one Y coordinate detection TFT 6*b* correspond to one scanning line 14.

It is to be rioted that, in this embodiment, the respective Y coordinate detection TFTs 6*b* are aligned in a line in a row direction (a direction parallel to the X coordinate detection lines 19) at substantially the same intervals as the intervals of the respective Y coordinate detection lines 20 on the side of the region outside the screen area that is adjacent to the screen area 2. The respective X coordinate detection TFTs 6*a* are aligned in a line in the row direction outside the respective Y coordinate detection TFTs 6*b* to be adjacent to the respective Y coordinate detection TFTs 6*b*.

Further, each scanning line 14 is connected with the gate electrodes 7 of both one X coordinate detection TFT 6*a* and one Y coordinate detection TFT 6*b* corresponding to this scanning line 14, each X coordinate detection line 19 is connected with the source electrode 12 of each X coordinate detection TFT 6*a*, and each Y coordinate detection line 20 is connected with the source electrode 12 of each Y coordinate detection TFT 6*b*.

Furthermore, each X coordinate detection TFT 6*a* and each Y coordinate detection TFT 6*b* are arranged near a position where each Y coordinate detection line 20 is extended to the region outside the screen area. Each Y coordinate detection line 20 is extended to be connected with the source electrode 12 of each Y coordinate detection TFT 6*b*. Each scanning line 14 is connected with the gate electrodes 7 of each X coordinate detection TFT 6*a* and each Y coordinate detection TFT 6*b* through extension wires 14*a* extended from the scanning lines 14 in the column direction. Each X coordinate detection line 19 is connected with the source electrode 12 of each X coordinate detection TFT 6*a* through an extension line 19*a* drawn and extended on the outer side of the screen area 2 from each of these X coordinate detection lines 19.

Moreover, in the region outside the screen area of the rear substrate 3, one X coordinate detection output line (second output line) 21*a* corresponding to each X coordinate detection TFT 6*a* and one Y coordinate detection output line (first output line) 21*b* corresponding to each Y coordinate detection TFT 6*b* are formed along the column direction.

Additionally, the drain electrode 13 of each X coordinate detection TFT 6*a* is connected with one X coordinate detection output line 21*a*, and the drain electrode 13 of each Y coordinate detection TFT 6*b* is connected with one Y coordinate detection output line 21*b*.

Each of the X coordinate detection output line 21*a* and the Y coordinate detection output line 21*b* is formed of the same metal film as the source electrode 12 and the drain electrode 13 of the respective TFTs 6, 6*a* and 6*b* for display, X coordinate detection and Y coordinate detection on the gate insulating film 8. One end of each of the output lines 21*a* and 21*b* is drawn out to a driver mount portion 3*a* (see FIG. 1) formed by protruding one end portion of the rear substrate 3 toward the outside of the front substrate 4, and it is connected to each of external circuit connection terminals 22*a* and 22*b* provided on the driver mount portion 3*a*.

Additionally, each X coordinate detection electrode 25 and each Y coordinate detection electrode 26 are arranged to be adjacent to each other near each line intersecting portion at which each X coordinate detection line 19 crosses each Y coordinate detection line 20.

On the other hand, each contact portion 31 provided on the inner surface of the front substrate is formed into a shape that comes into contact with both the X coordinate detection electrode 25 and the Y coordinate detection electrode 26 that are adjacent to each other to face each arrangement portion of the X coordinate detection electrode 25 and the Y coordinate detection electrode 26 that are adjacent to each other.

Each contact portion 31 is formed so that the portion of the opposed electrode 16 that faces each of the X coordinate detection electrode 25 and the Y coordinate detection electrode 26 faces each of the X coordinate detection electrode 25 and the Y coordinate detection electrode 26 to interpose a gap therebetween, and it is formed to protrude with a height that achieves contact with each of the X coordinate detection electrode 25 and the Y coordinate detection electrode 26 by flexural deformation in the inner surface direction due to touch from the outer surface side of the front substrate 4.

In this embodiment, a convex portion 32 having a shape facing both the X coordinate detection electrode 25 and the Y coordinate detection electrode 26 is formed of a photosensitive resin or the like on the light shielding film 17, and the opposed electrode 16 is formed thereon, thereby forming a portion of the opposed electrode 16 on the convex portion 32 as the contact portion 31.

Additionally, columnar spacers 33 (see FIG. 6) that define a gap between the rear substrate 3 and the front substrate 4 are dotted and arranged at positions different from those of the contact portions 31 on the surface of the front substrate 4 facing the rear substrate 3.

The respective columnar spacers 33 are formed of an insulating material such as a photosensitive resin on the opposed electrode 16, and they are provided to face every several pixel TFTs 6 in the respective pixel TFTs 6 arranged in the row direction and the column direction.

It is to be noted that the color filters 18R, 18G, and 18B are formed to exclude positions where each convex portion 32 forming the contact portion 31 and each columnar spacer 33 are formed, the convex portion 32 is formed to be higher than a film thickness of each of the color filters 18R, 18G, and 18B, and the columnar spacer 33 is formed to be higher than the convex portion 32.

Further, the light shielding films 17 provided on the front substrate 4 are formed in regions between pixels of the screen area 2 and the entire region outside the screen area where each X coordinate detection TFT 6*a* and each Y coordinate detection TFT 6*b* are arranged. The color filters 18R, 18G and 18B are provided corresponding to the screen area 2. The opposed electrode 16 is formed over the screen area 2 and the entire region outside the screen area.

Furthermore, alignment films 34 and 35 are formed on the rear substrate 3 and the front substrate 4 to cover the respective pixel electrodes, the respective X coordinate detection and Y coordinate detection TFTs 6*a* and 6*b*, the opposed electrode 16, the respective contact portions 31 and the respective columnar spacers 33.

It is to be noted that, although the opposed electrode 16 and the alignment films 34 and 35 are formed over the screen area 2 and the region outside the screen area in this embodiment, but the opposed electrode 16 and the alignment films 34 and 35 may be formed in the screen area 2 alone.

The rear substrate 3 and the front substrate 4 are oppositely arranged to define the gap between the substrates 3 and 4 so that each contact portion 31 faces the X coordinate detection electrode 25 and the Y coordinate detection electrode 26 to interpose an appropriate gap, and they are bonded through a frame-like sealing material 36 (see FIG. 1) that surrounds the screen area 2 and the region outside the screen area.

Moreover, a liquid crystal layer 37 is put in a region surrounded by the sealing material 36 in the gap between the substrates 3 and 4, and a polarizing plate (not shown) is arranged on the outer surface of each of the rear substrate 3 and the front substrate 4.

It is to be noted that this liquid crystal display panel 1 may be any one of a TN or STN type panel in which liquid crystal molecules of the liquid crystal layer 37 are twist-oriented between the substrates 3 and 4, a homeotropic alignment type panel in which the liquid crystal molecules are aligned substantially vertically with respect to the surfaces of the substrates 3 and 4, a non-twisted homogeneous alignment type panel in which the liquid crystal molecules are aligned substantially horizontally with respect to the surfaces of the substrates 3 and 4 with molecular major axes being aligned in one direction, a bend alignment type panel in which the liquid crystal molecules are subjected to bent alignment, a ferromagnetic or antiferromagnetic liquid display panel and others, or it may be a polymer network type liquid crystal display panel.

Figure 2:
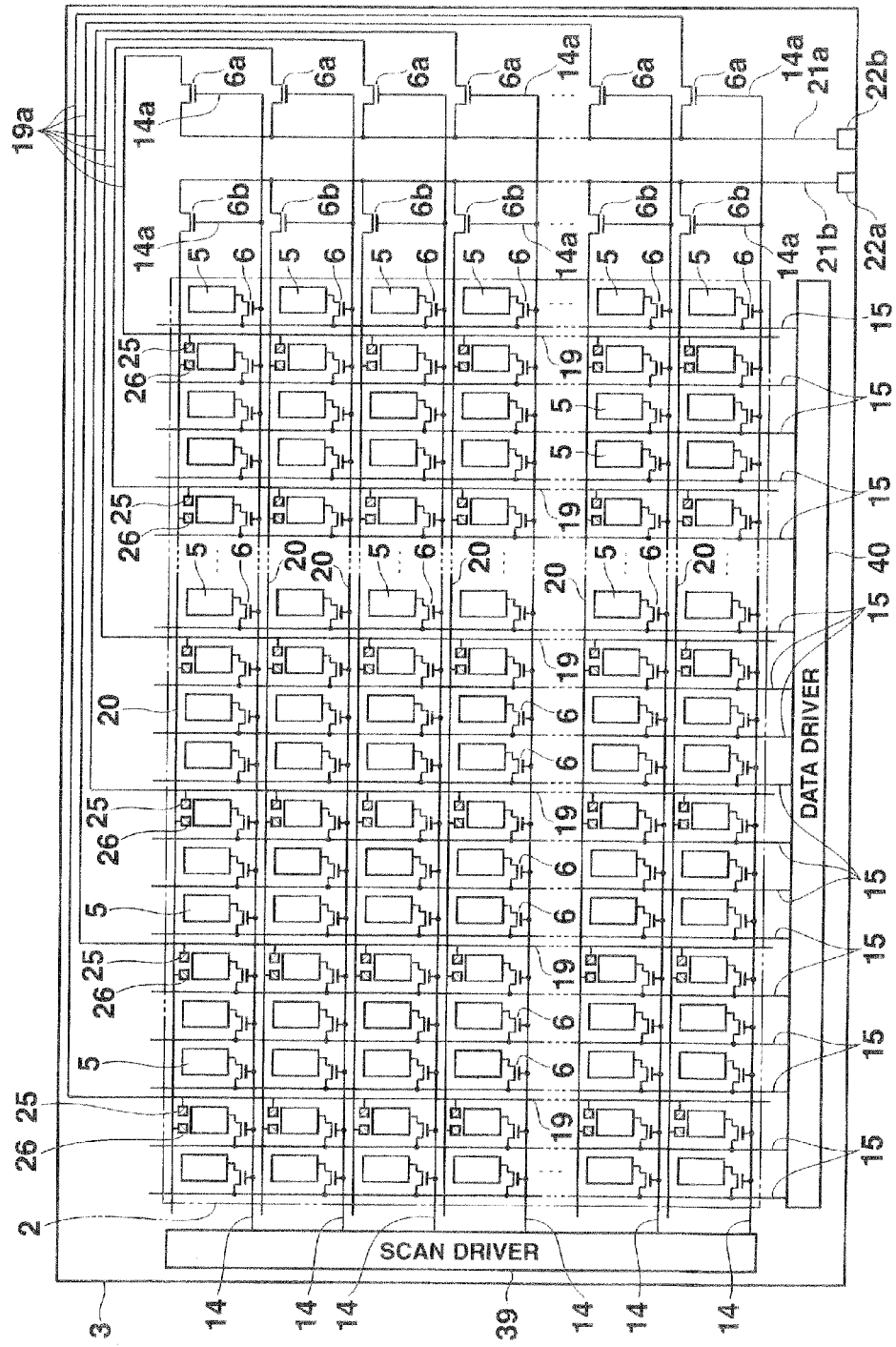
FIG. 2 is an equivalent configuration view of a circuit formed on a first substrate.

Additionally, a driver element 38 including an LSI in which the scan driver 39 and the data driver 40 shown in FIG. 2 are formed is mounted on the driver mount portion 3a of the rear substrate 3. Each scanning line 14 and each signal line 15 are led out to the driver mount portion 3a to be connected with respective output terminals of the scan driver 39 and the data driver 40.

Figure 3:
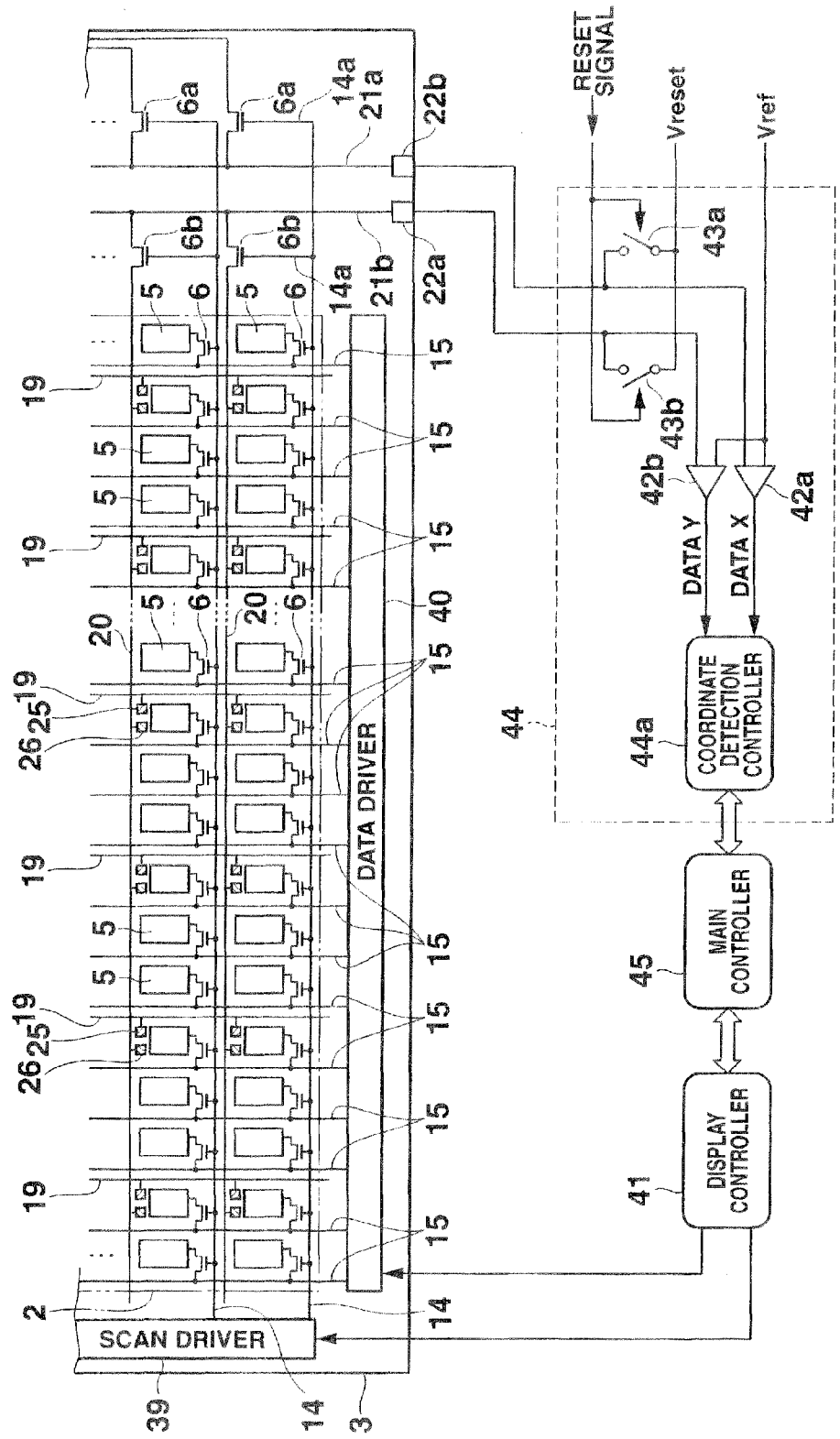
FIG. 3 is a block configuration view of a circuit connected to a liquid crystal display panel.
Figure 4:
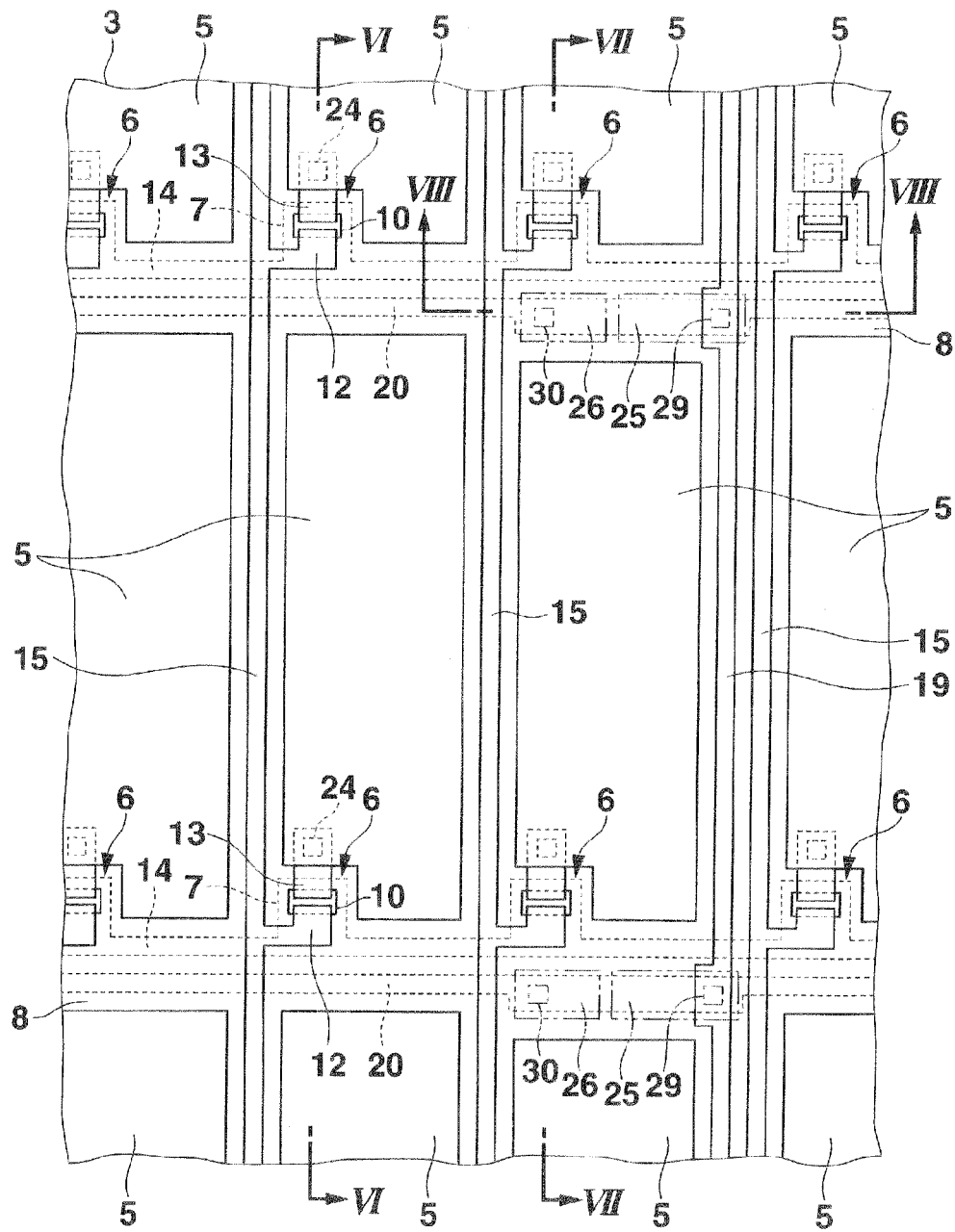
FIG. 4 is a plan view of an enlarged part of a screen area of the first substrate (an alignment film and an overcoat insulating film are not shown)
Figure 5:
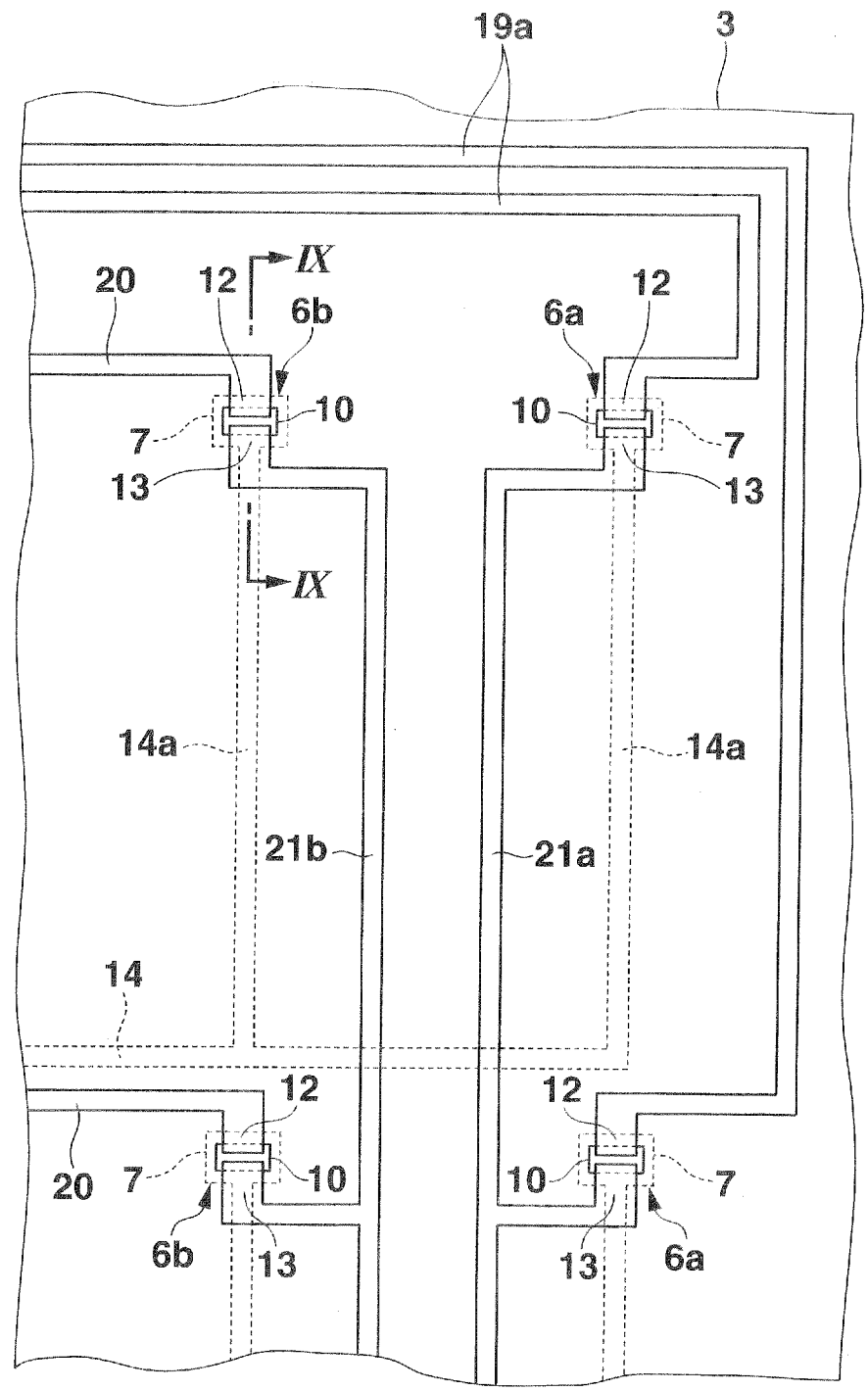
FIG. 5 is a plan view of an enlarged part of a region of the first substrate where an X-coordinate detection transistor and a Y-coordinate detection transistor are disposed (the alignment film and the overcoat insulating film are not shown)
Figure 6:
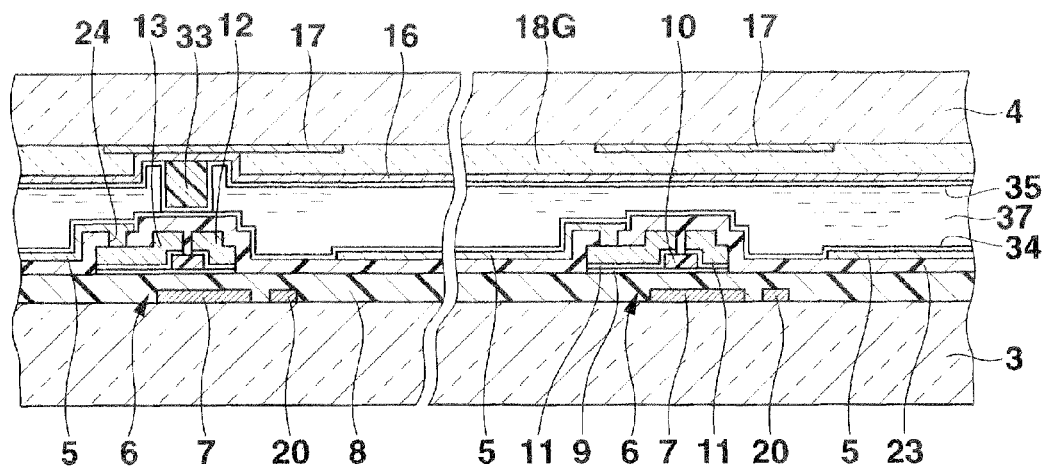
FIG. 6 is a sectional view of the liquid crystal display panel corresponding to a zone taken along the line VI-VI of FIG. 4.
Figure 7:
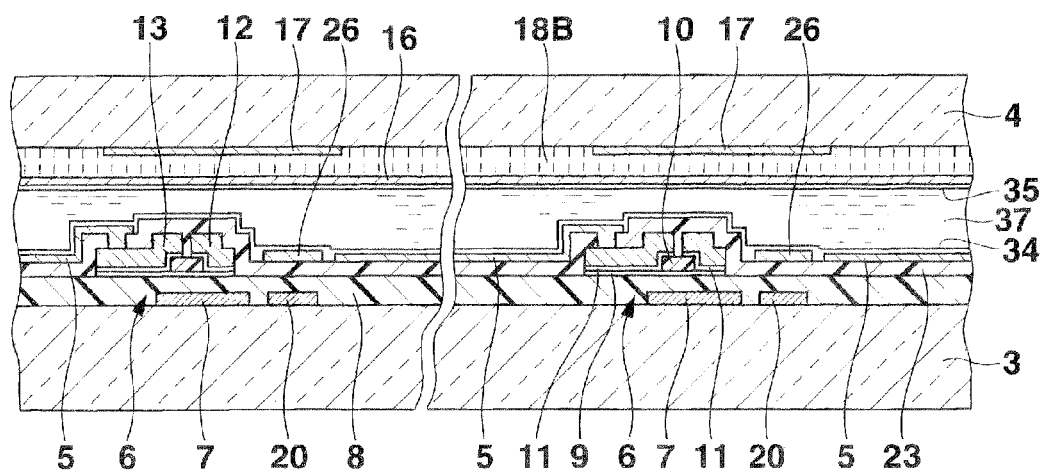
FIG. 7 is a sectional view of the liquid crystal display panel corresponding to a zone taken along the line VII-VII of FIG. 4.

On the other hand, as shown in FIGS. 1 and 3, external circuits connected with the liquid crystal display panel 1 include a display controller 41 that controls the scan driver 39 and the data driver 40 of the driver element 38, an X coordinate detection comparator 42a connected with an external circuit connection terminal 22a of the X coordinate detection output line 21a connected with the drain electrode 13 of each X coordinate detection TFT 6a, a Y coordinate detection comparator 42b connected with an external circuit connection terminal 22b of the Y coordinate detection output line 21b connected with the drain electrode 13 of each Y coordinate detection TFT 6b, a coordinate detection controller 44a that detects an X coordinate and a Y coordinate of a touch point based on data X output from the X coordinate detection comparator 42a and data Y output from the Y coordinate detection comparator 42b, and a main controller 45 that controls the display controller 41 and the coordinate detection controller 44a.

It is to be noted that, although omitted in the drawing, an opposed electrode terminal formed on the driver mount portion 3a and a cross electrode that is formed at one or more corner portions of the substrate bonding portion provided by the frame-like sealing material 36 and is connected with the opposed electrode terminal are provided on the rear substrate 3 of the liquid crystal display panel 1. The opposed electrode 16 provided on the front substrate 4 is electrically connected with the cross electrode in the substrate bonding portion.

The liquid crystal display panel 1 is driven for display by applying a common signal to the opposed electrode 16 through the opposed electrode terminal from a non-illustrated common signal generation circuit, sequentially outputting the gate signals for turning on the pixel TFTs 6 to the scanning lines 14 extending parallel to one another every predetermined scanning lines (every scanning line in the embodiment) by the scan driver 39 of the display controller 41, and applying a data signal having a voltage difference corresponding to image data with respect to the common signal to each signal line 15 during the selection period of each scanning line 14 by a data driver 40 of the display controller 41.

Incidentally, as display driving scheme of the liquid crystal display panel 1, there are a frame reversal scheme for reversing a voltage of the common signal applied to the opposed electrode 16 to a high level (which will be referred to as an H level hereinafter) and a low level (which will be referred to as an L level hereinafter) in accordance with each frame required for displaying one screen and a line reversal scheme for reversing the voltage of the common signal to the H level and the L level in accordance with each selection period of each scanning line 14, and any driving scheme may be adopted.

Giving a description on an operation of the liquid crystal display panel 1 as a touch panel, touch input with respect to the liquid crystal display panel 1 is carried out by touching or pressing an arbitrary position in the screen area 2 from the outer surface side of the front substrate 4 during the display driving by using a fingertip, a touch pen, or the like.

When the touch input is carried out, a touched portion (which will be referred to as a touch portion hereinafter) of the front substrate 4 undergoes flexural deformation toward the inside, the contact portion 31 of the touch portion in the respective contact portions 31 formed on the opposed electrode 16 of the front substrate 4 comes into contact with the X coordinate detection electrode 25 and the Y coordinate detection electrode 26 that face this contact portion 31, and the opposed electrode 16, the X coordinate detection electrode 25 and the Y coordinate detection electrode 26 that have come into contact with the contact portion 31 are energized.

It is to be noted that the contact portion 31 comes into contact with the X coordinate detection electrode 25 and the Y coordinate detection electrode 26 through the alignment films 35 and 34 provided on the front substrate 4 and the rear substrate 3, but each of the alignment films 35 and 34 is a very thin film having a film thickness of approximately 0.02 μm. Therefore, a current flows between the contact portion 31, the X coordinate detection electrode 25 and the Y coordinate detection electrode 26 through these alignment films 35 and 34, and the opposed electrode 16 and the X coordinate detection electrode 25 and the Y coordinate detection electrode 26 that have come into contact with the contact portion 31 are energized.

Moreover, the X coordinate detection electrodes 25 are connected with each X coordinate detection line 19, and the Y coordinate detection electrodes 26 are connected with each Y coordinate detection line 20. Therefore, when the contact portion 31 comes into contact with any one of the X coordinate detection electrodes 25 connected with one X coordinate detection line 19, this X coordinate detection line 19 is charged with a voltage from the opposed electrode 16, and the voltage in the X coordinate detection line 19 becomes equal to a voltage of the common signal applied to the opposed electrode 16. Additionally, when the contact portion 31 comes into contact with any one of the Y coordinate detection electrodes 26 connected with one Y coordinate detection line 20, this Y coordinate detection line 20 is charged with a voltage from the opposed electrode 16, and the voltage in the Y coordinate detection line 20 becomes equal to the voltage of the common signal.

Further, since each scanning line 14 is connected with one X coordinate detection TFT 6a and one Y coordinate detection TFT 6b in the respective X coordinate detection TFTs 6a and the respective Y coordinate detection TFTs 6, one X coordinate detection TFT 6a and one Y coordinate detection TFT 6b having the gate electrodes 7 connected with the scanning line 14 selected during the selection period for the respective scanning lines 14 are turned on.

Therefore, a signal corresponding to a charge voltage of the X coordinate detection line 19 connected with the source electrode 12 of the X coordinate detection ITT 6a that has been turned on based on application of the gate signal from the scanning line 14 selected during the selection period for the respective scanning lines 14 is output to the X coordinate detection output line 21a from the drain electrode 13 of the X coordinate detection TFT 6*a*. A signal corresponding to a charge voltage of the Y coordinate detection line 20 connected with the source electrode 12 of the Y coordinate detection TFT 6*b* that has been turned on based on application of the gate signal from the selected scanning line 14 is output to the Y coordinate detection output line 21*b* from the drain electrode 13 of the Y coordinate detection TFT 6*b*.

That is, in this liquid crystal display panel 1, parallel data on an X coordinate corresponding to the charge voltage for each X coordinate detection line 19 is converted into X coordinate serial data that turns to a charge voltage value of each X coordinate detection line 19 in accordance with the selection order of the respective scanning lines 14, an X coordinate serial data signal of this data is output from the X coordinate detection output line 21*a*, parallel data on a Y coordinate corresponding to the charge voltage for each Y coordinate detection lien 20 is converted into Y coordinate serial data that turns to a charge voltage value of each Y coordinate detection line 20 in accordance with the selection order of the respective scanning lines 14, and a Y coordinate serial data signal of this data is output from the Y coordinate detection output line 21*b*.

The X coordinate serial data signal output from the X coordinate detection output line 21*a* is input to a data signal terminal of the X coordinate detection comparator 42*a*, and the Y coordinate serial data signal output from the Y coordinate detection output line 21*b* is input to a data signal terminal of the Y coordinate detection comparator 42*b*.

The X coordinate detection comparator 42*a* compares the voltage of the X coordinate serial data signal input to the data signal terminal during each selection period for the scanning lines 14 with a reference voltage Vref having a predetermined value lower than the common signal voltage from a non-illustrated reference signal generation unit. This comparator outputs a digital signal having a value 1 when the voltage of the X coordinate serial data signal is higher than the reference voltage Vref (at the time of the common signal voltage), and it outputs a digital signal having a value 0 when the voltage of the X coordinate serial data signal is lower than the reference voltage Vref.

Further, the Y coordinate detection comparator 42*b* compares a voltage of the Y coordinate serial data signal input to the data signal terminal thereof during each selection period of the scanning lines 14 with the reference voltage Vref from the reference signal generation unit. It outputs a digital signal having a value 1 when the voltage of the Y coordinate serial data signal is higher than the reference voltage Vref (at the time of the common signal voltage), and it outputs a digital signal having a value 0 when the voltage of the Y coordinate serial data signal is lower than the reference voltage Vref.

That is, each of data X output from the X coordinate detection comparator 42*a* and data Y output from the Y coordinate detection comparator 42*b* is digital data that has a value 1 or 0 during each selection period of the scanning lines 14.

Furthermore, the coordinate detection controller 44*a* detects an X coordinate and a Y coordinate of a touch point in the screen area 2 of the liquid crystal display panel 1 based on the data X output from the X coordinate detection comparator 42*a* and the data Y output from the Y coordinate detection comparator 42*b*, and outputs X coordinate data and Y coordinate data to the outside.

It is to be noted that, when the contact portion 31 does not come into contact with any one of the X coordinate detection electrodes 25 connected with one X coordinate detection line 19, this X coordinate detection line 19 is not charged with the voltage. When the contact portion 31 does not come into contact with any one of the Y coordinate detection electrodes 26 connected with one Y coordinate detection line 20, this Y coordinate detection line 20 is not charged with the voltage.

However, since each scanning line 14 is selected in accordance with each frame, in a previous frame, the contact portion 31 comes into contact with any one of the X coordinate detection electrodes 25 connected with the one X coordinate detection line 19 to charge the X coordinate detection line 19 with the voltage from the opposed electrode 16. A signal corresponding to a charge voltage of the previous frame (which will be referred to as a residual charge voltage hereinafter) is input to the source electrode 12 of the X coordinate detection TFT 6*a* from the X coordinate detection line 19 connected with the X coordinate detection electrodes 25 that do not come into contact with the contact portion 31, and an X coordinate serial data signal including an erroneous voltage corresponding to the residual charge voltage is output from the X coordinate detection output line 21*a*.

Likewise, in the previous frame, when the contact portion 31 comes into contact with any one of the Y coordinate detection electrodes 26 connected with the one Y coordinate detection line 20 to charge the Y coordinate detection line 20 with the voltage from the opposed electrode 16, a signal corresponding to the residual charge voltage is input to the source electrode 12 of the Y coordinate detection TFT 6*b* from the Y coordinate detection line 20 connected with the Y coordinate detection electrodes 25 that do not come into contact with the contact portion 31, and a Y coordinate serial data signal including an erroneous voltage corresponding to the residual charge voltage is output from the Y coordinate detection output line 21*b*.

Figure 11:
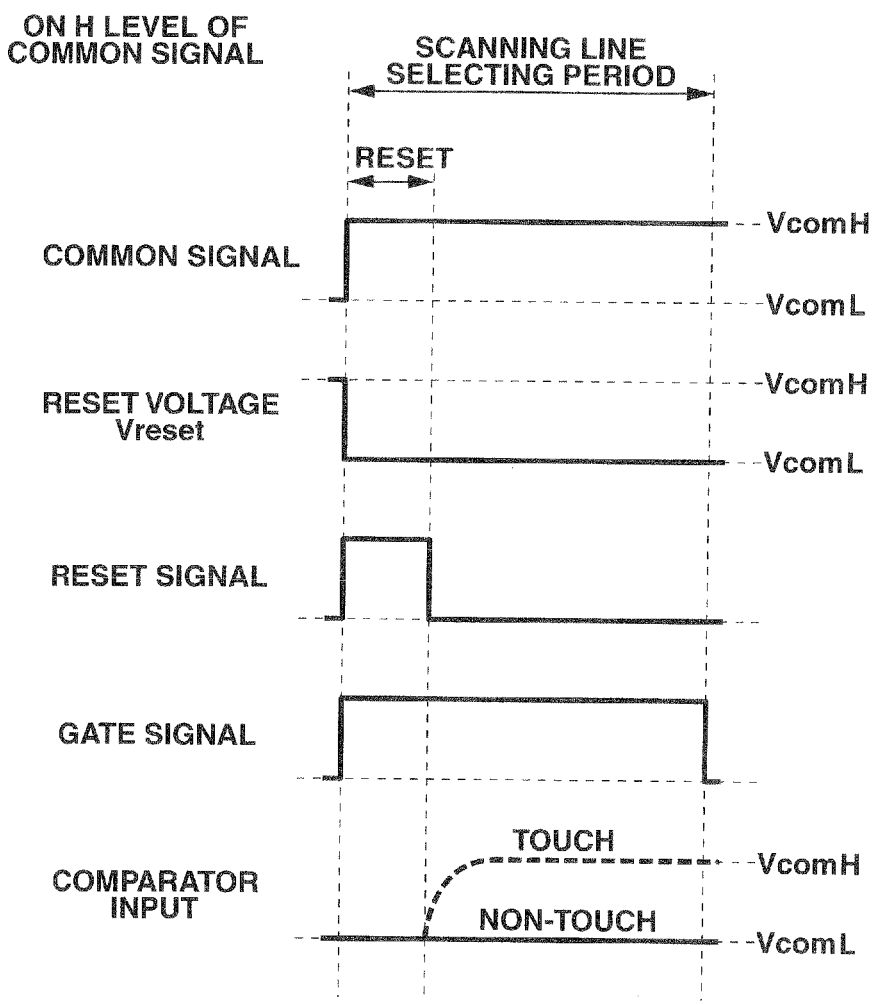
FIG. 11 is a comparator input sequence diagram when a high-level common signal is applied in accordance with a scanning line selecting period.
Figure 12:
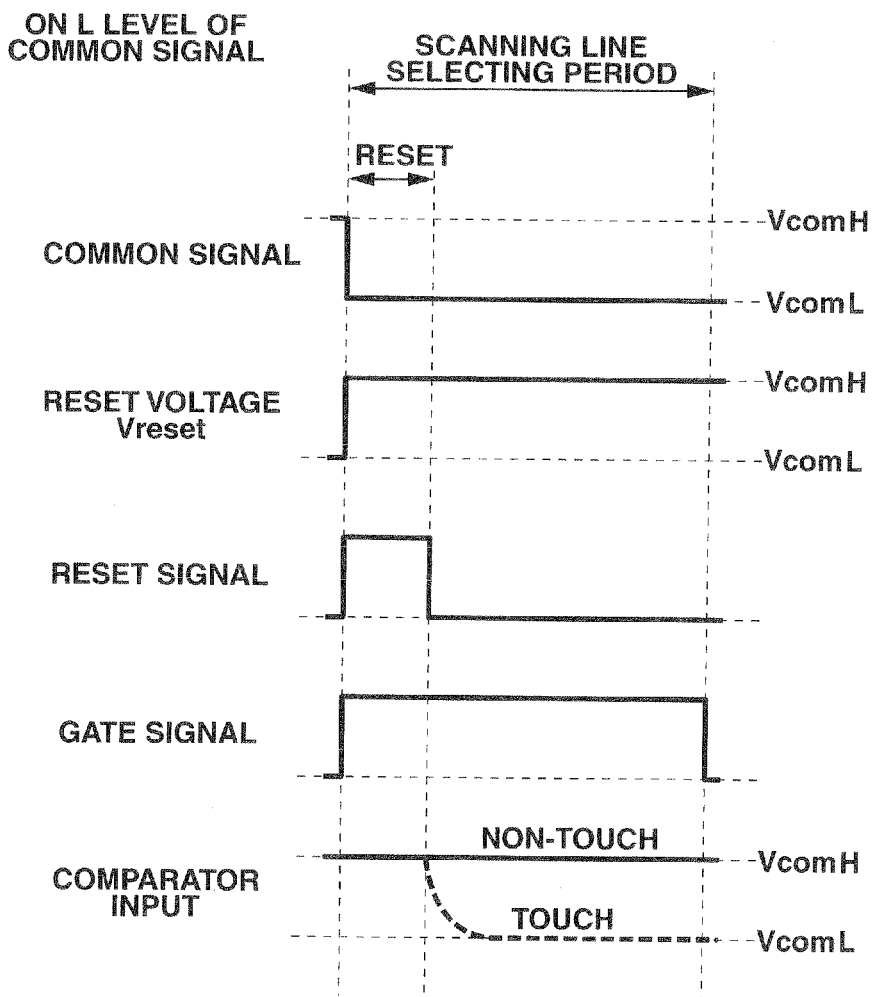
FIG. 12 is a comparator input sequence diagram when a low-level common signal is applied in accordance with the scanning line selecting period.

Therefore, in this embodiment, reset switches 43*a* and 43*b* that are utilized to connect a non-illustrated reset voltage generation unit are provided to a data signal input line for the X coordinate detection comparator 42*a* and a data signal input line for the Y coordinate detection comparator 42*b*. As shown in FIGS. 11 and 12, the first reset switch 43*a* and the second reset switch 43*b* are changed over to the connection side of the reset voltage generation unit based on a reset signal on an initial stage of the selection period for the respective scanning lines 14 to supply a reset voltage Vreset from the reset voltage generation unit to the data signal input line for the X coordinate detection comparator 42*a* and the data signal input line for the Y coordinate detection comparator 42*b*, thereby avoiding erroneous detection of a touch point coordinate due to input of the X coordinate serial data signal and the Y coordinate serial data signal including an erroneous voltage corresponding to the residual charge voltage to the X coordinate detection comparator 42*a* and the Y coordinate detection comparator 42*b*.

The reset voltage Vreset a voltage having a waveform obtained by reversing a waveform of the common signal, i.e., a voltage opposite to the common signal voltage. In case of both performing display driving based on the frame reversal and performing display driving based on the line reversal, the X coordinate serial data signal and the Y coordinate serial data signal including the erroneous voltage corresponding to the residual charge voltage are canceled by supplying the reset voltage Vreset to the data signal input line for the X coordinate detection comparator 42*a* and the data signal input line for the Y coordinate detection comparator 42*b* on the initial stage of the selection period of the respective scanning lines 14, an X coordinate signal data signal and a Y coordinate serial data signal that are accurate at the present moment are input to the X coordinate detection comparator 42*a* and the Y coordinate detection comparator 42*b*, thereby increasing a detection accuracy of the coordinate detection controller 44*a* for the X coordinate and the Y coordinate of the touch point.

It is to be noted that Vcom H denotes a common signal voltage on the H level and Vcom L designates a common signal voltage on the L level in FIGS. 11 and 12. When the common signal on the H level is applied to the opposed electrode 16, the voltage Vcom L is provided at the time of non-touch that the contact portion 31 does not come into contact with any one of the X coordinate detection electrodes 25 connected with one X coordinate detection line 19 during each selection period for the respective scanning lines 14. At the time of touch that the contact portion 31 comes into contact with any one of the X coordinate detection electrodes 25 connected with the one X coordinate detection line 19, an X coordinate serial data signal that provides the voltage Vcom H after the reset is input to the X coordinate detection comparator 42a. At the time of non-touch that the contact portion 31 does not come into contact with any one of the Y coordinate detection electrodes 26 connected with one Y coordinate detection line 20, the voltage Vcom L is provided. At the time of touch that the contact portion 31 comes into contact with any one of Y coordinate detection electrodes 26 connected with the one Y coordinate detection line 20, a Y coordinate serial data signal that provides the voltage Vcom H after the reset is input to the Y coordinate detection comparator 42b.

Moreover, when the common signal on the L level is applied to the opposed electrode 16, as shown in FIG. 12, the voltage Vcom H is provided at the time of non-touch that the contact portion 31 does not come into contact with any one of the X coordinate detection electrodes 25 connected with one X coordinate detection line 19 in accordance with each selection period of the respective scanning lines 14. At the time of touch that the contact portion 31 comes into contact with any one of the X coordinate detection electrodes 25 connected with the one X coordinate detection line 19, an X coordinate serial data signal that provides the voltage Vcom L after the reset is input to the X coordinate detection comparator 42a. The voltage Vcom H is provided at the time of non-touch that the contact portion 31 does not come into contact with any one of the Y coordinate detection electrodes 26 connected with one Y coordinate detection line 20. At the time of touch that the contact portion 31 comes into contact with any one of the Y coordinate detection electrodes 26 connected with the one Y coordinate detection line 20, a Y coordinate serial data signal that provides the voltage Vcom L after the reset is input to the Y coordinate detection comparator 42b.

Figure 13:
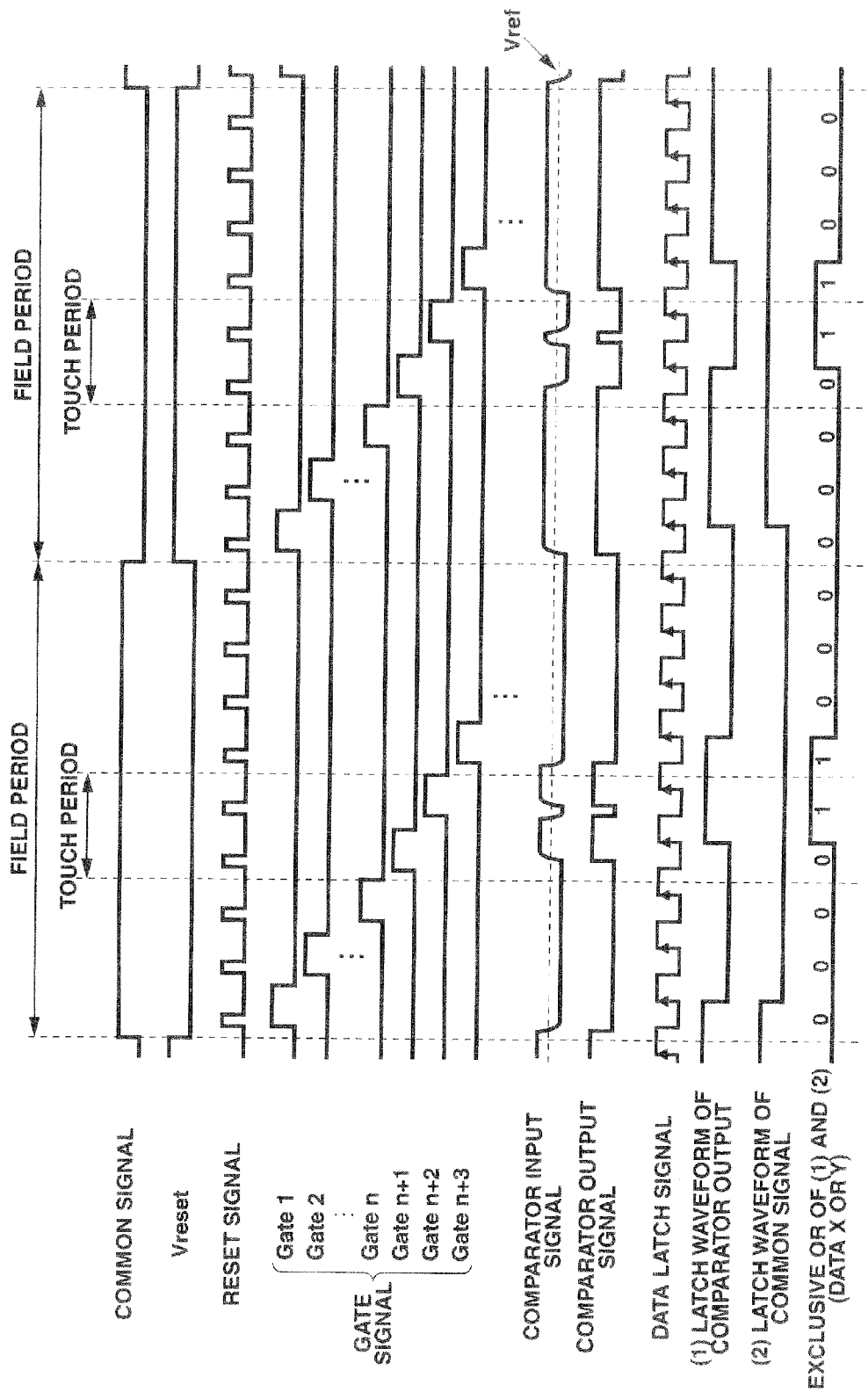
FIG. 13 is a waveform chart for driving signals and signals of a touched-point coordinate detection system when driving in accordance with a frame inversion scheme.
Figure 14:
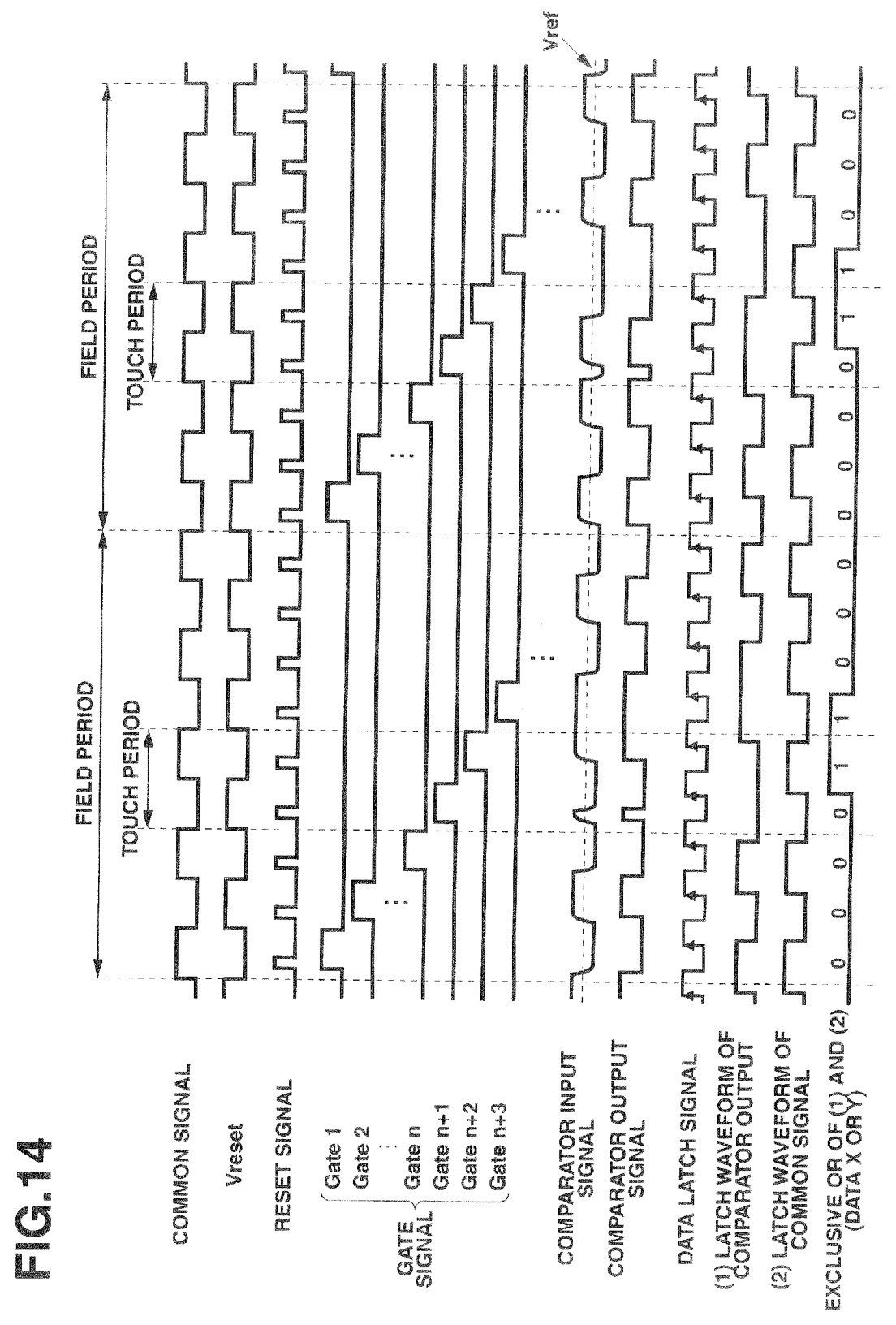

In FIGS. 13 and 14, Gate 1, Gate 2, . . . , Gate n, Gate n+1, Gate n+2, and Gate n+3 denote gate signals applied to the respective first, second, . . . , nth, n+1th, n+2th, and n+3th scanning lines 14. When the liquid crystal display panel 1 is driven based on the frame reversal scheme, signals having such waveforms as shown in FIG. 13 are output from the X and Y coordinate detection comparators 42a and 42b in response to input of the serial data signals to these comparators 42a and 42b, and the coordinate detection controller 44a outputs X or Y coordinate data of the touch point based on a binary signal of "0" and "1" as an exclusive OR of a latch waveform of each comparator output and a latch waveform of the common signal.

Additionally, when the liquid crystal display panel 1 is driven based on the line reversal scheme, the X and Y coordinate detection comparators 42a and 42b output signals having such waveforms as depicted in FIG. 14 based on input of the serial data signals to the X and Y coordinate detection comparators 42a and 42b, and the coordinate detection controller 44a outputs X or Y coordinate data of a touch point constituted of a binary signal of "0" and "1" as an exclusive OR of a latch waveform of each comparator output and a latch waveform of the common signal.

According to the liquid crystal display apparatus 1a, in the region outside the screen area 2 of the rear substrate 3, the X coordinate detection TFTs 6a having the gate electrodes 7 connected with the respective scanning lines 14 and having the source electrodes 12 connected with the respective X coordinate detection lines 19, the Y coordinate detection TFTs 6b having the gate electrodes 7 connected with the respective scanning lines 4 and having the source electrodes 12 connected with the respective Y coordinate detection lines 20, the X coordinate detection output line 21a connected with the drain electrode 13 of each X coordinate detection TFT 6a, and the Y coordinate detection output line 21b having the drain electrode 13 connected with each Y coordinate detection TFT 6b are provided. Therefore, each of the X coordinate parallel data corresponding to the charge voltage for each X coordinate detection line 19 and the Y coordinate parallel data corresponding to the charge voltage for each Y coordinate detection line 20 are converted into serial data to be output to the coordinate detection circuit 44, so that the configuration of the coordinate detection circuit 44 can be greatly simplified as compared with a circuit including a conventional parallel/serial conversion circuit.

Moreover, in the liquid crystal display panel 1 since each X coordinate detection TFT 6a and each Y coordinate detection TFT 6b are arranged in the region outside the screen area on one end side of each scanning line 14 and each Y coordinate detection line 20, an arrangement space of each X coordinate detection TFT 6a and each Y coordinate detection TFT 6b can be consolidated, thereby alleviating an increase in size of the liquid crystal display panel caused due to provision of each X coordinate detection TFT 6a and each Y coordinate detection TFT 6b.

Additionally, in the liquid crystal display panel 1, since each of the X coordinate detection TFT 6a and the Y coordinate detection TFT 6b is formed into the same laminated structure as the pixel TFT 6, the TFT 6, the X coordinate detection TFT 6a and the Y coordinate detection TFT 6b can be collectively formed, thereby manufacturing the apparatus at a low cost in a process that is almost the same as manufacture of an active matrix liquid crystal display panel having no touch apparatus function.

Furthermore, in the liquid crystal display panel 1, the X-coordinate detection electrode 25 and the Y-coordinate detection electrode 26 are arranged to overlap the Y-coordinate detection line 20 formed under the X-coordinate detection line 19. Thus, even if the X-coordinate detection electrode 25 and the Y-coordinate detection electrode 26 are physically pressed on the contact portion 31, a leakage failure of an X-coordinate detection system and a Y-coordinate detection system is relatively inhibited.

That is, when the X-coordinate detection electrode 25 and the Y-coordinate detection electrode 26 are arranged to overlap the Y-coordinate detection line 20 formed under the X-coordinate detection line 19, the gate insulating film (second insulating film) 8 and the blocking insulating film 9 can be easily located between the Y-coordinate detection line 20 and the X-coordinate detection electrode 25 in addition to the overcoat insulating film (first insulating film) 23 without any increase in the manufacturing process. Thus, the performance of insulation between the X-coordinate detection system and the Y-coordinate detection system can be improved.

On the other hand, when the X-coordinate detection electrode 25 and the Y-coordinate detection electrode 26 are arranged to overlap the X-coordinate detection line 19 formed above the Y-coordinate detection line 20 (in a fourth embodiment described later), the gate insulating film (second insulating film) 8 and the blocking insulating film 9 are not easily located between the X-coordinate detection line 19 and the Y-coordinate detection electrode 26.

Further, in the liquid crystal display panel 1, the X coordinate detection electrode 25 and the Y coordinate detection electrode 26 are formed on one or both of the X coordinate detection line 19 and the Y coordinate detection line 20 (on the Y coordinate detection line 20 in the embodiment) through the insulating film (the overcoat insulating film 23 in this embodiment), and these electrodes are connected with the X coordinate detection line 19 and the Y coordinate detection line 20 in the contact holes 29 and 30 provided in the insulating film, whereby each pixel electrode 5 that is adjacent to the arrangement portion of the X coordinate detection electrode 25 and the Y coordinate detection electrode 26 can be formed with a sufficient area.

Figure 21:
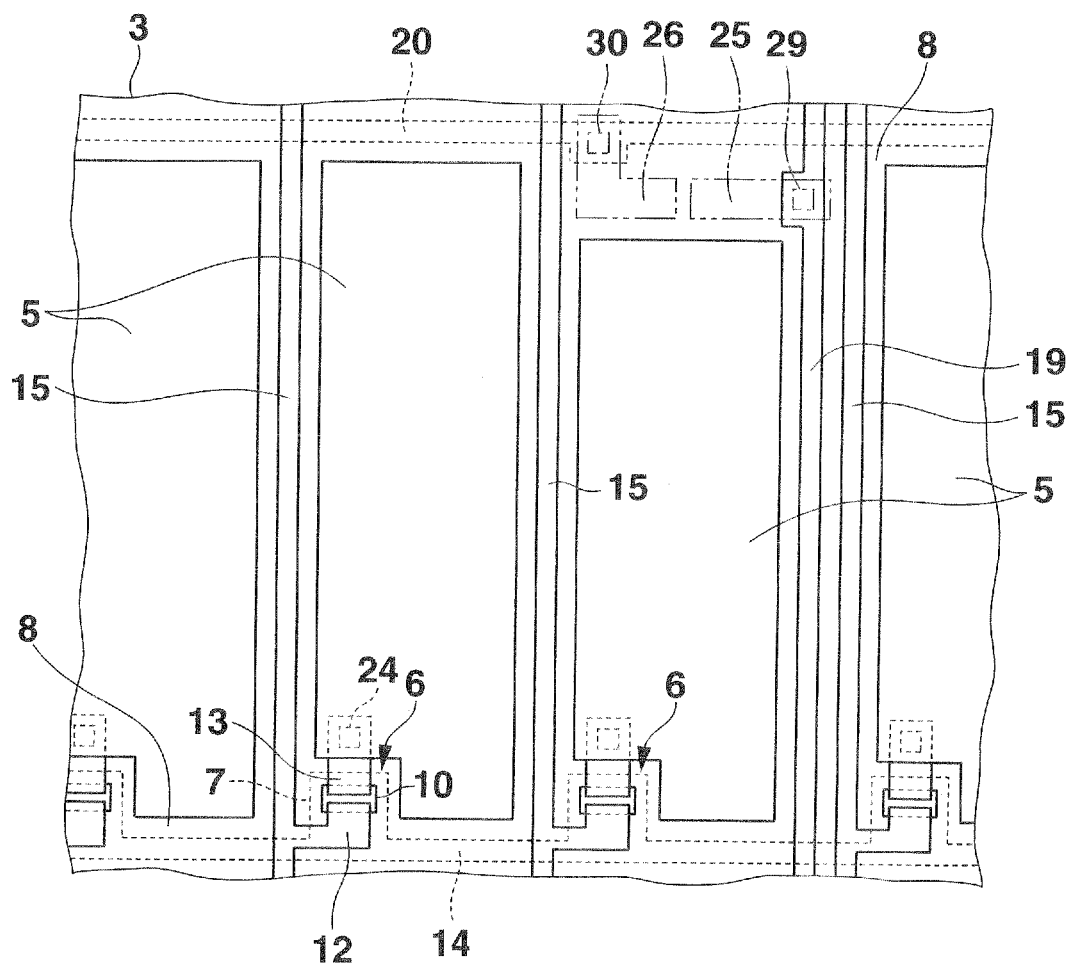
FIG. 21 is a plan view of an enlarged part of a screen area of a first substrate of a liquid crystal panel shown as a comparative example (an alignment film and an overcoat insulating film are not shown)

That is, in the liquid crystal display panel according to the comparative example shown in FIG. 21, the X coordinate detection electrode 25 and the Y coordinate detection electrode 26 are arranged between the Y coordinate detection line 20 and the pixel electrode 5. It is to be noted that a description on any other structure in the liquid crystal display apparatus according to this comparative example will be omitted by giving the same reference numerals to members corresponding to those in the foregoing embodiment.

In the liquid crystal display panel according to this comparative example, since the arrangement space for the X coordinate detection electrode 25 and the Y coordinate detection electrode 26 must be allocated between the Y coordinate detection line 20 and the pixel electrode 5, each pixel electrode 5 adjacent to the arrangement portion of these contact electrodes 25 and 26 must be formed to be greatly apart from the Y coordinate detection line 20. Thus, an area of each pixel electrode 5 adjacent to the arrangement portion of the contact electrodes 25 and 26 is considerably small, thereby greatly reducing an aperture ratio of a pixel corresponding to this pixel electrode 5.

Contrary to the liquid crystal display panel according to the comparative example, since the X coordinate detection electrode 25 and the Y coordinate detection electrode 26 are arranged on the Y coordinate detection line 20 in the liquid crystal display apparatus 1a according to the foregoing embodiment, the gap between the Y coordinate detection line 20 and the pixel electrode 5 can be very small. Therefore, the pixel electrode 5 adjacent to the arrangement portion of the X coordinate detection electrode 25 and the Y coordinate detection electrode 26 can be formed with a sufficient area, and a reduction in aperture ratio of a pixel corresponding to this pixel electrode 5 is decreased significantly.

Further, in the liquid crystal display panel 1 according to the foregoing embodiment, each X coordinate detection line 19 is formed of the same metal film as the gate electrode 7 of the pixel TFT 6, each Y coordinate detection line 20 is formed of the same metal film as the source electrode 12 and the drain electrode 13 of the pixel TFT 6, the insulating film is the gate insulating film 8 of each pixel TFT 6 and the overcoat insulating film 23 provided to cover each pixel TFT 6, each scanning line 14 and each signal line 15, the basal portion 27 formed into the same laminated structure as the laminated structure including the overcoat insulating film 23 of the pixel TFT 6 is formed on the rear substrate 3 corresponding to the region of the X coordinate detection electrode 25 and the Y coordinate detection electrode 26 with which the contact portion 31 formed on at least the opposed electrode 16 comes into contact on the rear substrate 3, and the X coordinate detection electrode 25 and the Y coordinate detection electrode 26 are formed on this basal portion 27. Therefore, the surfaces of the contact electrodes 25 and 26 with which the contact portion 31 comes into contact can be formed to be sufficiently higher than the pixel electrode 5 or the Y coordinate detection line 20, and the contact portion 31 can be assuredly brought into contact with the X coordinate detection electrode 25 and the coordinate detection electrode 26 alone.

Furthermore, in the liquid crystal display panel 1, since the basal portion 27 is formed into the same laminated structure as the laminated structure including the overcoat insulating 23 of each TFT 6, 6a or 6b, the basal portion 27 can be formed by utilizing the formation process of the pixel TFT 6, the X coordinate detection TFT 6a and the Y coordinate detection TFT 6b.

It is to be noted that the basal portion 27 is not restricted to the laminated structure completely equal to the laminated structure of each TFT 6, 6a or 6b, and it may be formed into a laminated structure obtained by eliminating the blocking insulating film 10 from the laminated structure of each TFT 6, 6a or 6b. That is, the basal portion 27 may be formed of a laminated film including the Y coordinate detection line 20, the gate insulating film 8, a two-layer film equal to respective films, i.e., the i-type semiconductor film 9 and the n-type semiconductor film 11, the upper metal film 28 constituted of the same metal film as the source and drain electrodes 12 and 13 of each TFT 6, 6a or 6b and the X coordinate detection line 19, and the overcoat insulating film 23. In this case, the basal portion 27 can be formed by utilizing the formation process of the pixel TFT 6, the X coordinate detection TFT 6a and the Y coordinate detection TFT 6b, and the contact portion 31 can be assuredly brought into contact with the X coordinate detection electrode 25 and the Y coordinate detection electrode 26 formed on the basal portion 27 alone.

Figure 8:
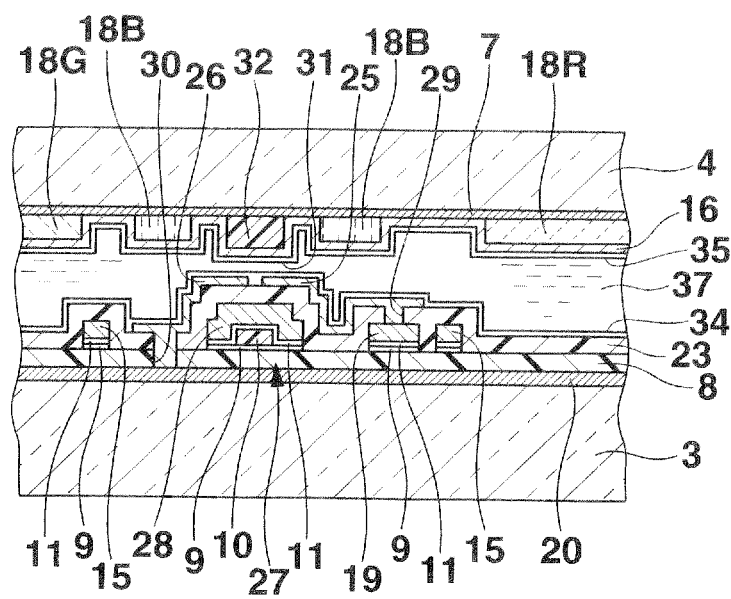
FIG. 8 is a sectional view of the liquid crystal display panel corresponding to a zone taken along the line VIII-VIII of FIG. 4.
Figure 9:
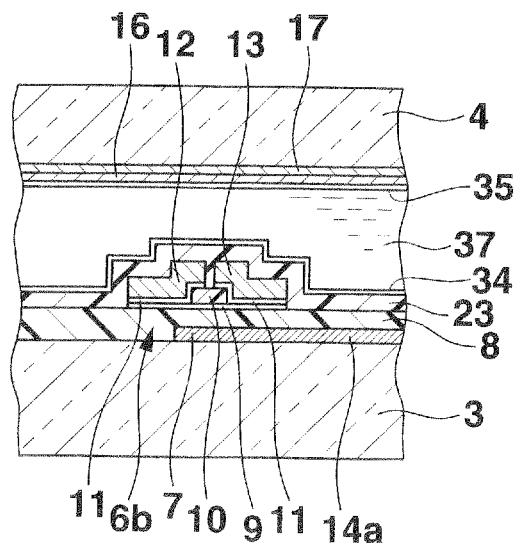
FIG. 9 is a sectional view of the liquid crystal display panel corresponding to a zone taken along the line IX-IX of FIG. 4.
Figure 10:
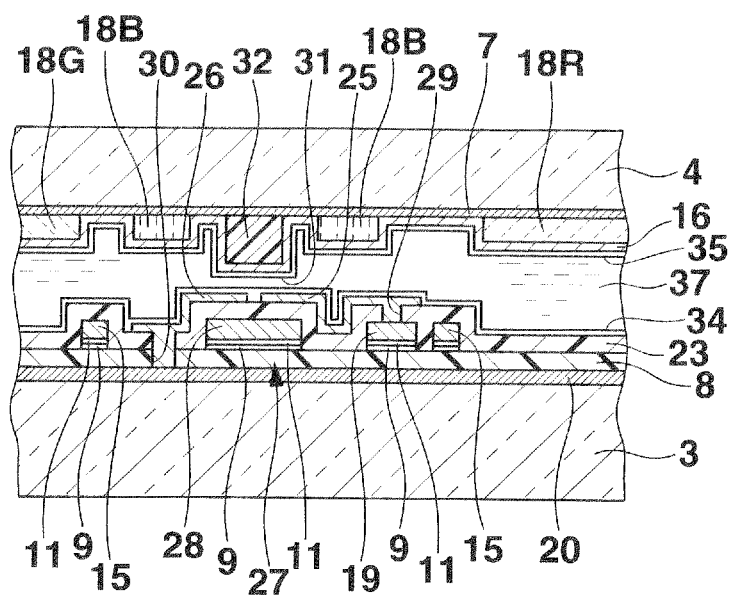
FIG. 10 is a sectional view of a part corresponding to FIG. 8 showing a modification of a foundation portion for forming a contact electrode.

In this modification, since the height of the basal portion 27 is reduced for an amount corresponding to a film thickness of the blocking insulating film 10 as compared with the embodiment depicted in FIG. 8, positions of the X coordinate detection electrode 25 and the Y coordinate detection electrode 26 are thereby lowered. However, each contact portion 31 can be caused to face the X coordinate detection electrode 25 and the Y coordinate detection electrode 26 to interpose the gap therebetween by increasing the protruding height of each contact portion 31 on the inner surface of the front substrate 4, and it can be brought into contact with the X coordinate detection electrode 25 and the Y coordinate detection electrode 26 based on flexural deformation in the inner surface direction due to tough from the outer surface side of the front substrate 4.

As described above, the liquid crystal display panel 1 is a display element for displaying images and is also a touch panel for detecting a point pressed by the user.

The liquid crystal display panel 1 comprises: a pixel electrode 5 to apply a voltage to a liquid crystal layer 37 disposed between the pixel electrode and an opposed electrode 16; a thin film transistor 6 connected to the pixel electrode 5; a scanning line 14 to supply a gate signal to the thin film transistor 6; a first coordinate detection line 20 disposed parallel to the scanning line 14; a first coordinate detection electrode 26 formed closer to the liquid crystal layer 37 in the thickness direction of the liquid crystal layer 37 than the first coordinate detection line 20, the first coordinate detection electrode 26 being formed in a region overlapping the first coordinate detection line 20; and a first insulating film 23 formed as a layer between the first coordinate detection line 20 and the first coordinate detection electrode 26, the first insulating film 23 being provided with a contact hole 30 to electrically connect the first coordinate detection line 20 and the first coordinate detection electrode 26.

The liquid crystal display panel 1 further comprises: a second coordinate detection line 19 disposed to intersect with the first coordinate detection line 20; and a second coordinate detection electrode 25 formed closer to the liquid crystal layer 37 in the thickness direction of the liquid crystal layer 37 than the second coordinate detection line 19.

The first insulating film 23 is formed as a layer between the second coordinate detection line 19 and the second coordinate detection electrode 25. The first insulating 23 is provided with a contact hole 29 to electrically connect the second coordinate detection line 19 and the second coordinate detection electrode 25.

In addition, the second coordinate detection electrode 25 is formed in a region overlapping the first coordinate detection line 20.

The liquid crystal display panel 1 further comprises a second insulating film 8 that is formed as a layer between the first coordinate detection line 20 and the second coordinate detection line 19.

The second coordinate detection line 19 is disposed closer to the liquid crystal layer 37 in the thickness direction of the liquid crystal layer 37 than the first coordinate detection line 20.

The first coordinate detection electrode 26 and the second coordinate detection electrode 25 are formed as the same layer as the pixel electrode 5.

The liquid crystal display panel 1 further comprises a signal line 15 to supply a data signal to the thin film transistor 6.

The second coordinate detection line 19 is formed parallel to the signal line 15.

The second coordinate detection line 19 is formed as the same layer as the signal line 15.

The first coordinate detection line 20 is formed as the same layer as the scanning line 14.

The liquid crystal display panel 1 further comprises a first substrate 3 on which the pixel electrode 5 formed; a second substrate 4 on which the opposed electrode 16 is formed; and a convex portion 32 formed on the second substrate 4 to face the first coordinate detection electrode 26 and the second coordinate detection electrode 25 and to protrude from the second substrate 4 toward the first substrate 3, the convex portion 32 electrically connecting the first coordinate detection electrode 26 and the second coordinate detection electrode 25 to the opposed electrode 16 when the second substrate 4 is pressed.

The convex portion 32 is formed between the second substrate 4 and the opposed electrode 16 so that the region of the opposed electrode 16 facing the first coordinate detection electrode 26 is located closer to the first substrate 3 than the region of the opposed electrode 16 facing the pixel electrode 5.

The convex portion 32 is also formed so that the region of the opposed electrode 16 facing the first coordinate detection electrode 26 and the region of the opposed electrode 16 facing the second coordinate detection electrode 25 are equal in distance from the first substrate 3.

The convex portion 32 is covered with the opposed electrode 16.

The pixel electrode 5 has a short side parallel to the scanning line 14 and a long side parallel to the signal line 15. The first coordinate detection electrode 26 is disposed adjacent to the second coordinate detection electrode 25 in a direction along the short side of the pixel electrode 5.

Second Embodiment

Figure 15:
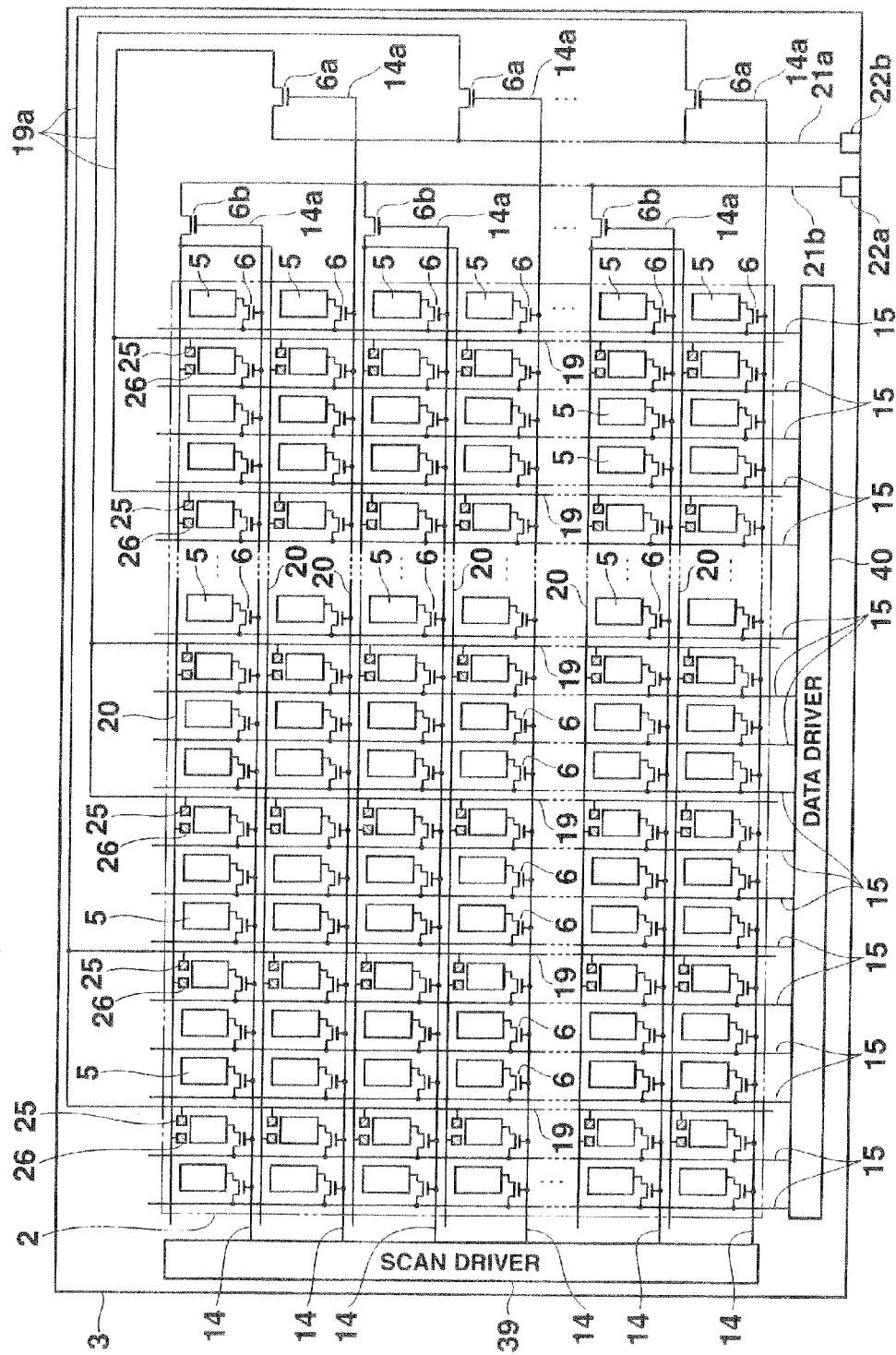
FIG. 15 is an equivalent configuration view of a circuit formed on a first substrate according to a second embodiment.
Figure 16:
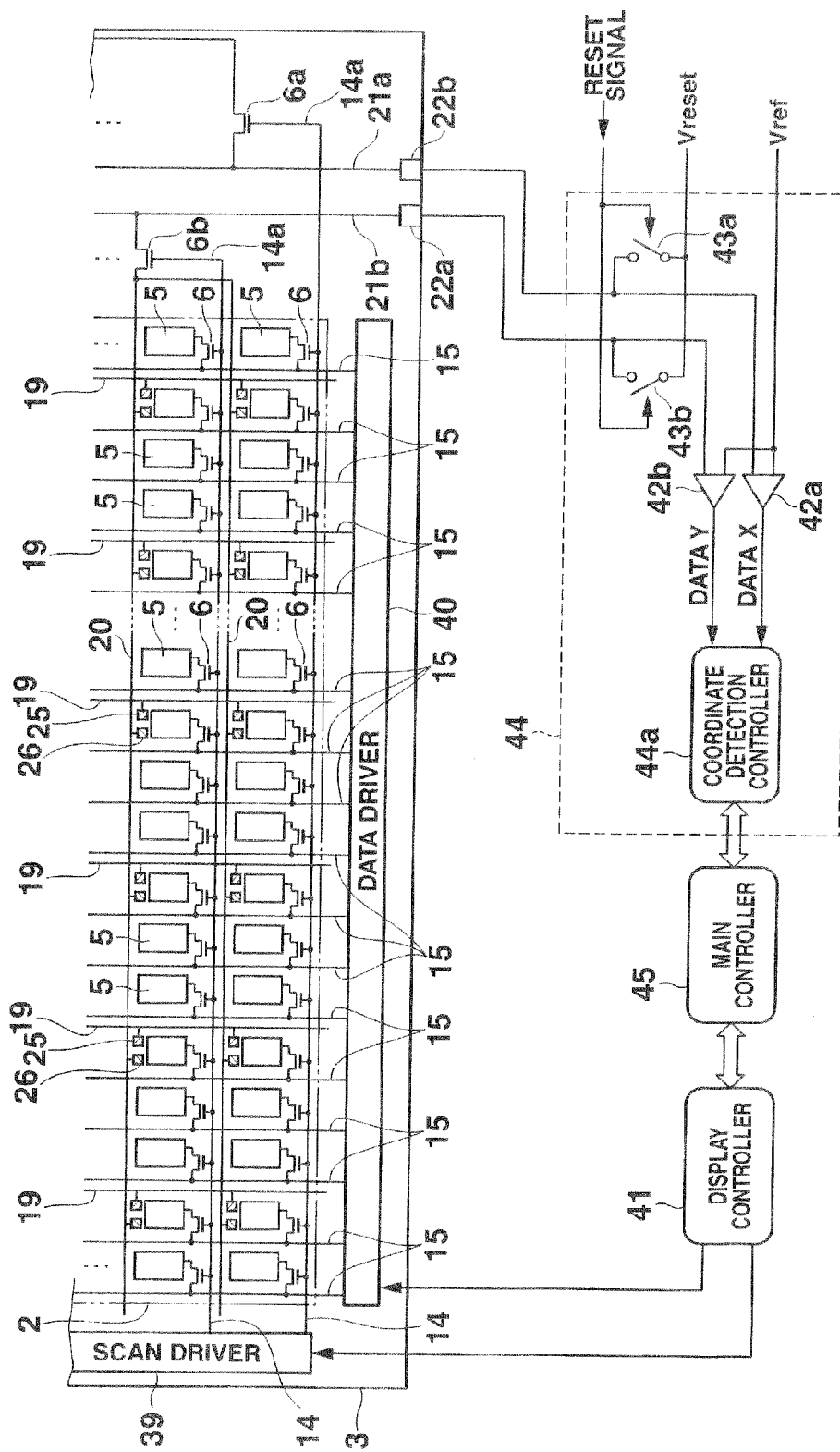
FIG. 16 is a block configuration view of a circuit connected to a liquid crystal display panel according to the second embodiment.

In a liquid crystal display panel according to a second embodiment depicted in FIG. 15, each Y coordinate detection line 20 is provided every predetermined number of pixel electrode rows, e.g., every row of the pixel electrodes 5, each X coordinate detection line 19 is provided every predetermined number of columns, e.g., every three columns of the pixel electrodes 5, each X coordinate detection TFT 6a is arranged in accordance with every other scanning line 14 of the respective scanning lines 14 corresponding to the respective pixel electrode columns where the Y coordinate detection line 20 is provided, and each Y coordinate detection TFT 6b is arranged in accordance with every other remaining scanning lines 14 of the respective scanning lines 14.

Additionally, in this embodiment, each scanning line 14 is connected with a gate electrode 7 of the X coordinate detection TFT 6a or the Y coordinate detection TFT 6b corresponding to this scanning line 14. A predetermined number of X coordinate detection lines 19 that are adjacent to each other, e.g., two X coordinate detection lines 19 form one set to be connected with a source electrode 12 of each X coordinate detection TFT 6a in accordance with each set. A predetermined number of Y coordinate detection lines 20, e.g., two Y coordinate detection lines 20 form one set to be connected with the source electrode 12 of each Y coordinate detection TFT 6b in accordance with each set.

Further, a drain electrode 13 of each X coordinate detection TFT 6a is connected with one X coordinate detection output line 21a, and the drain electrode 13 of each Y coordinate detection TFT 6b is connected with one Y coordinate detection output line 21b. It is to be noted that other structures in the liquid crystal display panel according to this embodiment are equal to those in the first embodiment, and hence like reference numerals denote like parts to omit a tautological explanation.

In the liquid crystal display panel according to this embodiment, the respective X coordinate detection lines 19 are provided every three columns of the respective pixel electrodes 5, the respective X coordinate detection TFTs 6a are arranged in accordance with every other scanning lines 14 of the respective scanning lines 14, the respective Y coordinate detection TFTs 6b are arranged every other remaining scanning lines 14 of the respective scanning lines 14, each scanning line 14 is connected with the gate electrode 7 of the X coordinate detection TFT 6a or the Y coordinate detection TFT 6b corresponding to this scanning line 14, two X coordinate detection lines 19 that are adjacent to each other form one set to be connected with the source electrode 12 of each X coordinate detection TFT 6a in accordance with each set, and two Y coordinate detection lines 20 that are adjacent to each other form one set to be connected with the source electrode 12 of each Y coordinate detection TFT 6b in accordance with each set, thereby substantially halving the number of the X coordinate detection TFTs 6a and the Y coordinate detection TFTs 6b as compared with the first embodiment.

Therefore, according to the liquid crystal display panel of this embodiment, an arrangement space of the X coordinate detection TFT 6a and the Y coordinate detection TFT 6b assured in a region outside a screen area 2 can be greatly reduced as compared with the first embodiment, thus further alleviating an increase in size of the liquid crystal display apparatus due to provision of each X coordinate detection TFT 6a and each Y coordinate detection TFT 6b.

Furthermore, in the liquid crystal display panel according to this embodiment, the two X coordinate detection lines 19 that are adjacent to each other form one set to be connected with the source electrode 12 of each X coordinate detection TFT 6a in accordance with each the two Y coordinate detection lines 20 that are adjacent to each other form one set to be connected with the source electrode 12 of each Y coordinate detection TFT 6b in accordance with each set. Therefore, for example, when the X coordinate detection TFTs 6a and the Y coordinate detection TFTs 6b that are equal to those in the first embodiment in number are arranged in the region outside the screen area, the X coordinate detection lines 18 can be arranged every predetermined number of rows smaller than three rows, e.g., every other row or every row. In this case, an arrangement pitch of the X coordinate detection electrode 25 and the Y coordinate detection electrode 26 in the row direction can be reduced, and an X coordinate of a touch point can be further accurately detected.

It is to be noted that, in the second embodiment, the two X coordinate detection lines 19 that are adjacent to each other form one set to be connected with the source electrode 12 of each X coordinate detection TFT 6a in accordance with each set and the two Y coordinate detection lines 20 that are adjacent to each other form one set to be connected with the source electrode 12 of each Y coordinate detection TFT 6b in accordance with each set. The present invention is not restricted thereto, any other number, e.g., three to five X coordinate detection lines 19 may form one set to be connected with the source electrode 12 of each X coordinate detection TFT 6a in accordance with each set, and three to five Y coordinate detection lines 20 that are adjacent to each other may form one set to be connected with the source electrode 12 of each Y coordinate detection TFT 6b in accordance with each set. Based on this configuration, an arrangement space of the X coordinate detection TFT 6a and the Y coordinate detection TFT 6b assured in the region other than the screen area can be further reduced, thereby further alleviating an increase in size of the liquid crystal display panel caused due to provision of each X coordinate detection TFT 6a and each Y coordinate detection TFT 6b.

Third Embodiment

Figure 17:
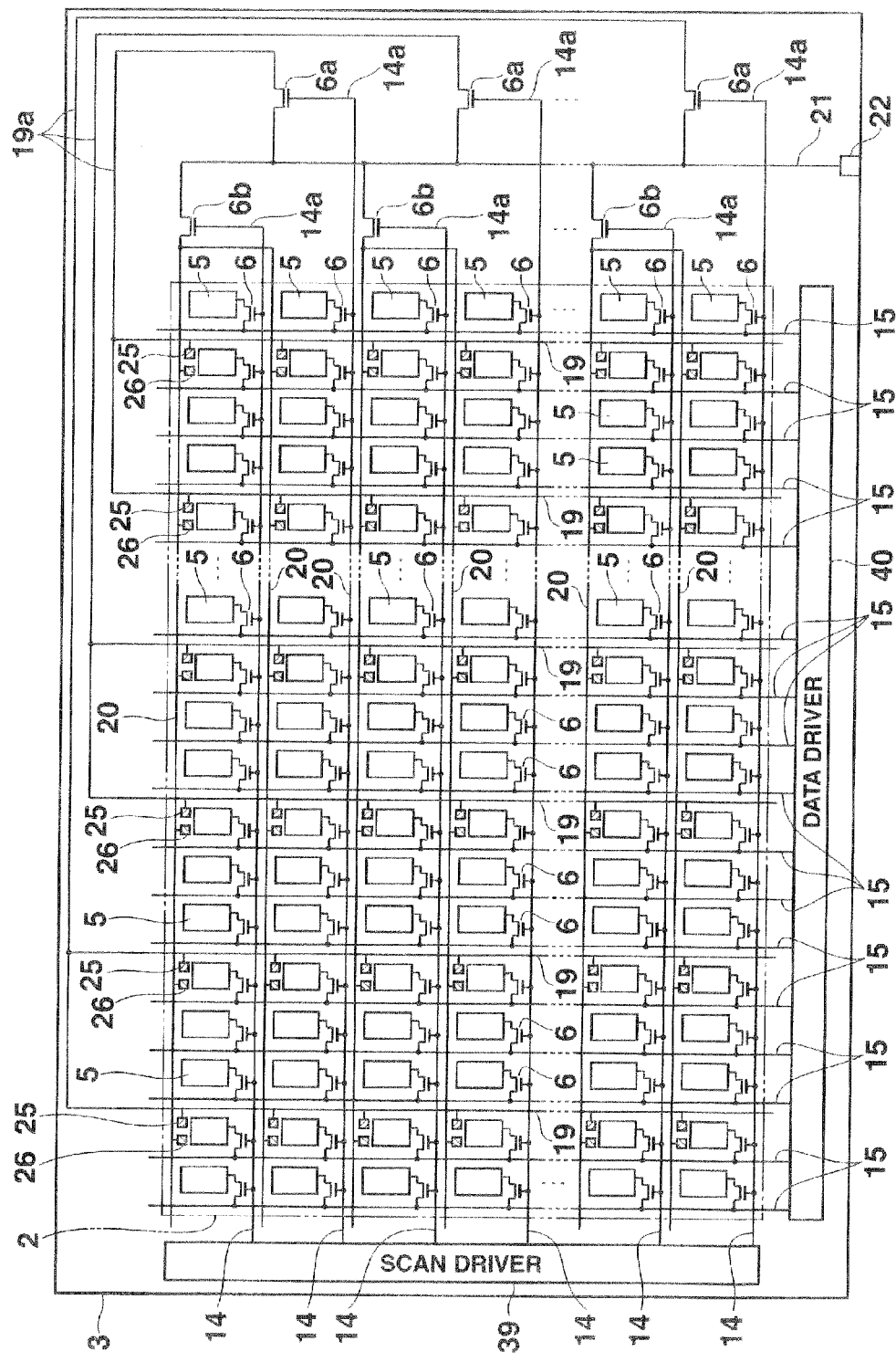
FIG. 17 is an equivalent configuration view of a circuit formed on a first substrate according to a third embodiment.
Figure 18:
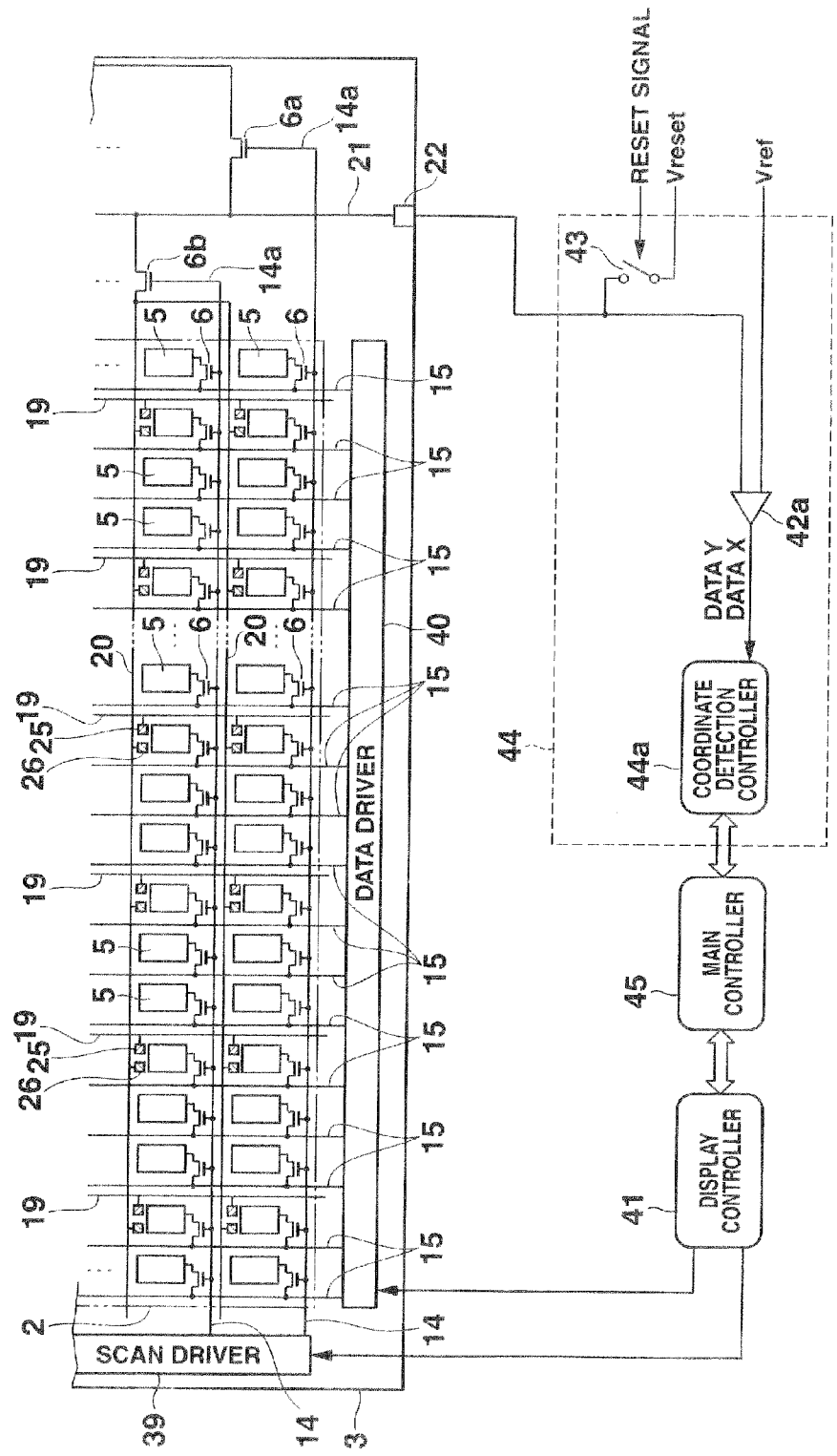
FIG. 18 is a block configuration view of a circuit connected to a liquid crystal display panel according to the third embodiment.

A liquid crystal display panel according to a third embodiment depicted in FIGS. 17 and 18 has a configuration that the drain electrode 13 of each X coordinate detection TFT 6a and the drain electrode 13 of each Y coordinate detection TFT 6b are connected with a common output line 21 for both X coordinate detection and Y coordinate detection and this common output line 21 outputs a serial data signal that alternately includes an X coordinate and a Y coordinate in a cycle synchronized with a selection period of respective scanning lines 14 in the liquid crystal display panel according to the second embodiment.

Furthermore, in this third embodiment, as shown in FIG. 18, external circuits include one comparator 42 for both X coordinate detection and Y coordinate detection, t is comparator 42 alternately inputs data X and data Y to a coordinate detection controller 44a, and the coordinate detection controller 44a discriminates the data X and the data Y in synchronization with the selection period of the respective scanning lines 14, thereby detecting an X coordinate and a Y coordinate of a touch point based on the data X and the data Y.

According to the third embodiment, since the output line from which the serial data signal is output is the single common output line 21 for both X coordinate detection and Y coordinate detection alone, an arrangement space of the X coordinate detection TFT 6a and the Y coordinate detection TFT 6b assured in a region other than a screen area 2 can be further reduced to be smaller than the second embodiment, thereby alleviating an increase in size of the liquid crystal display panel caused due to provision of each X coordinate detection TFT 6a and each Y coordinate detection TFT 6b.

Moreover, according to the third embodiment, since providing the single comparator 42 for both X coordinate detection and Y coordinate detection alone can suffice as the comparator provided in the external circuits, the external circuits can be further simplified as compared with the second embodiment.

Fourth Embodiment

Figure 19:
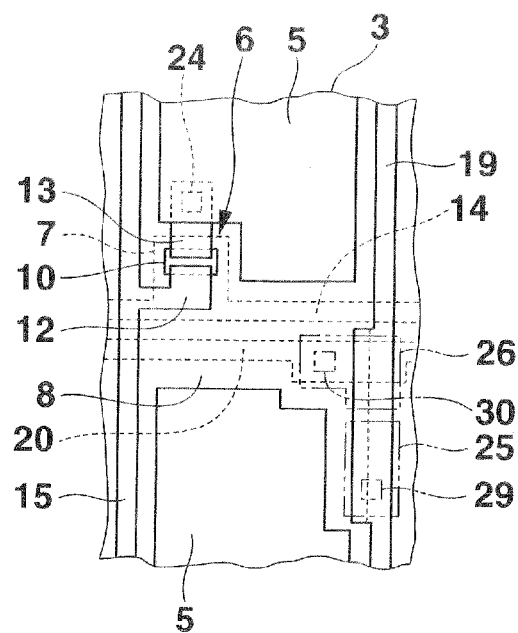
FIG. 19 is a plan view of an X-coordinate detection electrode and a Y-coordinate detection electrode according to a fourth embodiment.

In a liquid crystal display panel according to a fourth embodiment depicted in FIG. 19, the X coordinate detection electrode 25 and the Y coordinate detection electrode 26 are arranged at positions different from those in the first to third embodiments. In this embodiment, the X coordinate detection electrode 25 and the Y coordinate detection electrode 26 are arranged on an X coordinate detection line 19, an end portion of the Y coordinate detection electrode 26 on the opposite side of the side neighboring the X coordinate detection electrode 25 is formed into a shape bent in a direction of a Y coordinate detection line 20 on a line intersecting portion of the X coordinate detection line 19 and the Y coordinate detection line 20, and a bent portion of this X coordinate detection electrode 25 is connected with the Y coordinate detection line 20 in a contact hole 30 provided in an overcoat insulating film 23. It is to be rioted that structures except the arrangement of the X coordinate detection electrode 25 and the Y coordinate detection electrode 26 are equal to those in any one of the first to third embodiment, and hence like reference numerals denote like parts in the drawing to omit a tautological explanation.

Fifth Embodiment

Figure 20:
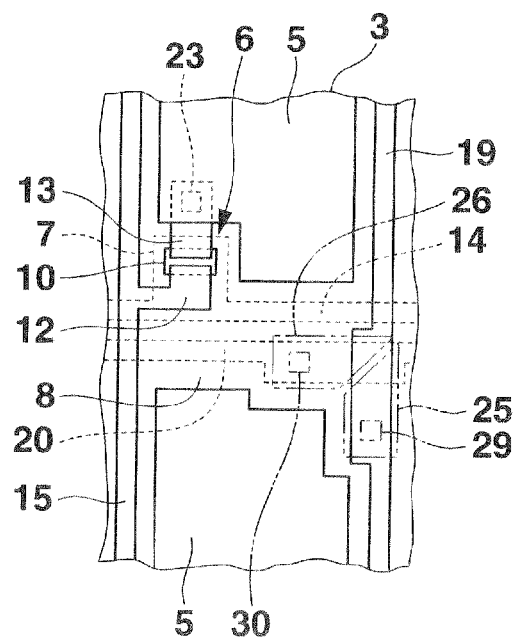
FIG. 20 is a plan view of an X-coordinate detection electrode and a Y-coordinate detection electrode according to a fifth embodiment.

In a liquid crystal display panel according to a fifth embodiment depicted in FIG. 20, the X coordinate detection electrode 25 and the Y coordinate detection electrode 26 are arranged at positions different from those in the first to fourth embodiments. In this embodiment, the X coordinate detection electrode 25 is arranged on a Y coordinate detection line 20, the Y coordinate detection electrode 26 is arranged on the Y coordinate detection line 20, end portions of the X coordinate detection electrode 25 and the Y coordinate detection electrode 26 are adjacent to each other on the line intersecting portion. It is to be noted that structures other than the arrangement of the X coordinate detection electrode 25 and the Y coordinate detection electrode 26 are equal to those in any one of the first to third embodiments, and hence like reference numerals denote like parts in the drawing to omit a tautological explanation thereof.

Other Embodiments

In the liquid crystal display panel according to each of the embodiments, the X-coordinate detection TFTs 6a and the Y-coordinate detection TFTs 6b are arranged on the rear substrate 3. The parallel data on the X coordinates corresponding to the charge voltage for each of the X-coordinate detection lines 19 and the parallel data on the Y coordinates corresponding to the charge voltage for each of the Y-coordinate detection lines 20 are converted to serial data. Then, the serial data are output to the external circuit from the X-coordinate detection and Y-coordinate detection output lines 21a, 21b connected to the drain electrodes 13 of each X-coordinate detection TFT 6a and each Y-coordinate detection TFT 6b or from the common output line 21. However, the X-coordinate detection TFTs 6a and the Y-coordinate detection TFTs 6b as well as the output lines 21a, 21b or the output line 21 may be omitted. In this case, the parallel data on the X coordinates corresponding to the charge voltage for each of the X-coordinate detection lines 19 and the parallel data on the Y coordinates corresponding to the charge voltage for each of the Y-coordinate detection lines 20 are output to the external having parallel/serial conversion circuits, respectively. Then, the parallel data are converted to serial data by the parallel/serial conversion circuits. Further, the external circuit performs parallel/serial conversion and detects X, Y coordinates of a touched point on the basis of the converted serial data.

Furthermore, in the embodiments described above, each of the Y-coordinate detection lines 20 is covered with the gate insulating film 8 of the pixel TFT 6, on which each of the X-coordinate detection lines 19 is formed. Moreover, each of the X-coordinate detection lines 19 is covered with the overcoat insulating film 23 of the pixel TFT 6, on which the X-coordinate detection electrode 25 and the Y-coordinate detection electrode are formed. However, the in, Mating film covering each of the Y-coordinate detection lines 20 and the insulating film covering each of the X-coordinate detection lines 19 may be any other insulating films.

Still further, in the embodiments described above, each of the X-coordinate detection lines 19 and each of the Y-coordinate detection lines 20 are provided to be insulated from each other. However, the X-coordinate detection lines and the Y-coordinate detection lines may be formed into lattice-shaped patterns using the same metal film. Then, a contact electrode for both X-coordinate detection and Y-coordinate detection is provided on one or both of the lines so that this contact electrode is connected to the lines. The contact portion provided on the front substrate comes into contact with the contact electrode, and a voltage is thus supplied from the contact portion to each of the X-coordinate detection lines and each of the Y-coordinate detection lines. In this way, the external circuit alternately detects X coordinates and Y coordinates of the touched point in accordance with a voltage value of each of the X-coordinate detection lines and a voltage value of each of the Y-coordinate detection lines.

Moreover, the liquid crystal display panel 1 according to each of the embodiments is an active matrix type. However, this invention is also applicable to any liquid crystal display panel other than the active matrix type. For example, this invention is applicable to a simple matrix type liquid crystal display panel. In this liquid crystal display panel, scan electrodes extending along a row direction are provided parallel to one another on the inner surface of one of first and second substrates. On the inner surface of the other substrate, signal electrodes extending along a column direction are provided parallel to one another.

[Examples of Devices Equipped with the Liquid Crystal Display Device]

Figure 22:
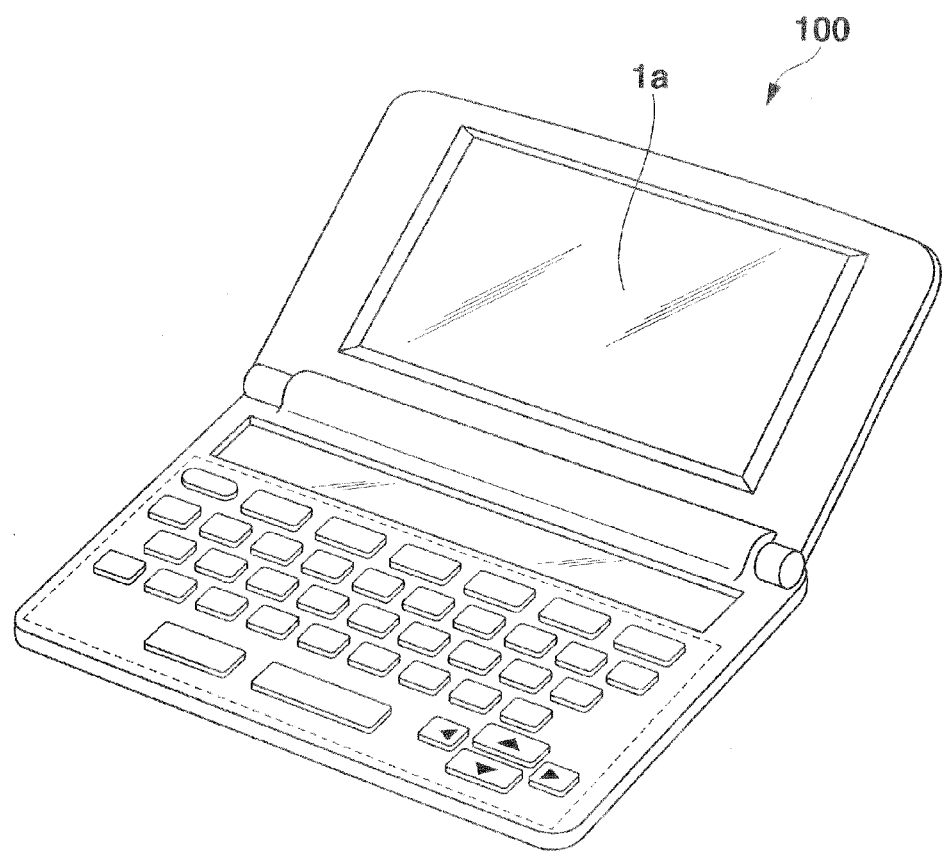
FIG. 22 is a perspective view of a first electronic device equipped with a liquid crystal display device.
Figure 23:
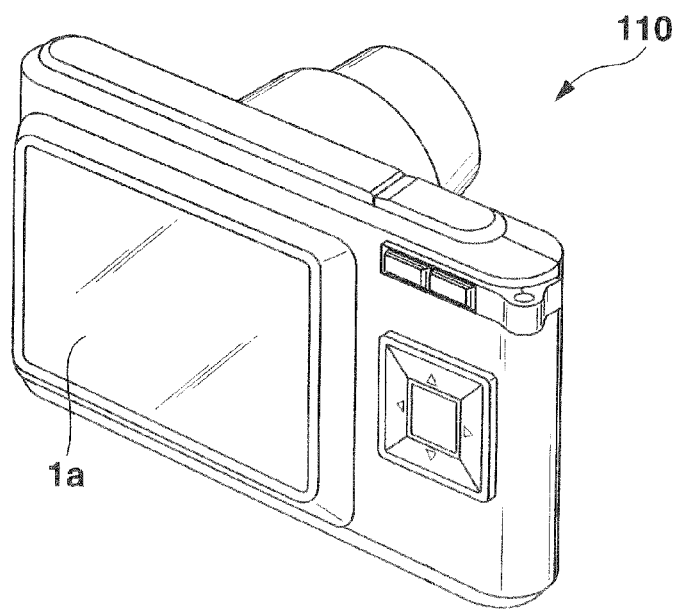
FIG. 23 is a perspective view of a second electronic device equipped with a liquid crystal display device.
Figure 24:
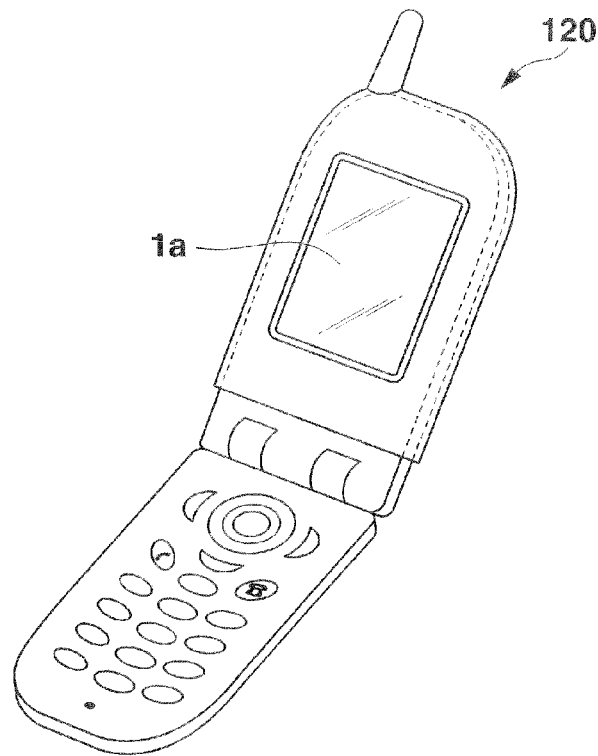
FIG. 24 is a perspective view of a third electronic device equipped with a liquid crystal display device.
Figure 25:
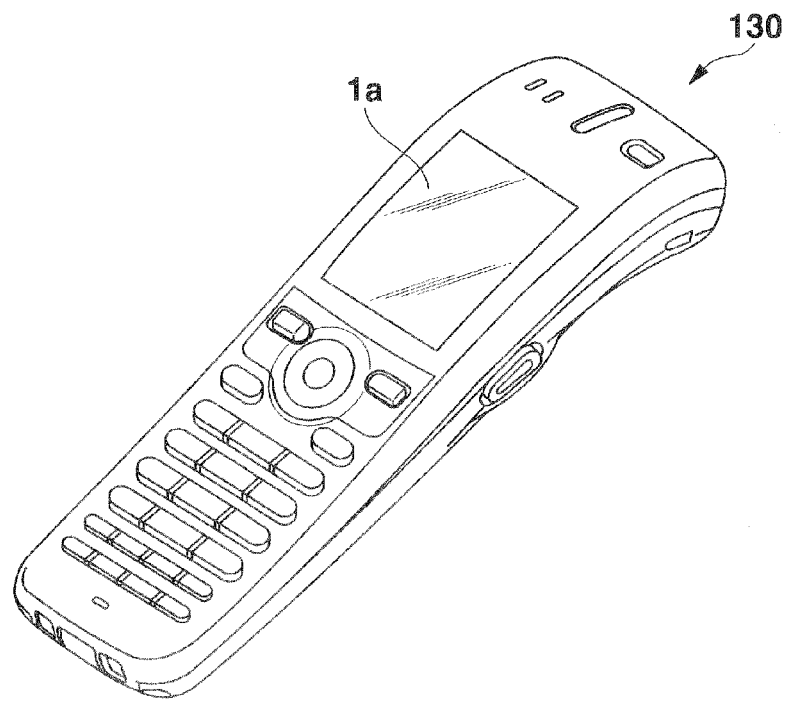
FIG. 25 is a perspective view of a fourth electronic device equipped with a liquid crystal display device.

First to fourth electronic devices shown in FIG. 22 to FIG. 25 are equipped with the liquid crystal display device according to this invention. Specifically, the liquid crystal display device is mounted on a monitor section 1a of the electronic device so that the liquid crystal display panel 1 that also functions as a touch panel is adaptable thereto. The first electronic device 100 shown in FIG. 22 is a notebook computer. The second electronic device 110 shown in FIG. 23 is a digital camera. The third electronic device 120 shown in FIG. 24 is a mobile telephone. The fourth electronic device 130 shown in FIG. 25 is a handy terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display panel comprising:
   a pixel electrode to apply a voltage to a liquid crystal layer disposed between the pixel electrode and an opposed electrode;
   a thin film transistor connected to the pixel electrode;
   a scanning line to supply a gate signal to the thin film transistor;
   a first coordinate detection line disposed parallel to the scanning line;
   a first coordinate detection electrode formed closer to the liquid crystal layer than the first coordinate detection line, the first coordinate detection electrode being formed in a region overlapping the first coordinate detection line;
   a first insulating layer formed as a layer between the first coordinate detection line and the first coordinate detection electrode, the first insulating layer being provided with a contact hole to directly electrically connect the first coordinate detection line and the first coordinate detection electrode;
   a second coordinate detection line disposed to intersect with the first coordinate detection line; and
   a second coordinate detection electrode formed closer to the liquid crystal layer than the second coordinate detection line,
   wherein the first insulating layer is formed as a layer between the second coordinate detection line and the second coordinate detection electrode, and is provided with a contact hole to directly electrically connect the second coordinate detection line and the second coordinate detection electrode, and
   wherein the second coordinate detection electrode is formed in a region overlapping the first coordinate detection line.

2. The liquid crystal display panel according to claim 1, wherein the contact hole of the first insulating layer is formed in a region overlapping the first coordinate detection line.

3. The liquid crystal display panel according to claim 1, further comprising a second insulating layer formed as a layer between the first coordinate detection line and the second coordinate detection line, the second coordinate detection line being disposed closer to the liquid crystal layer than the first coordinate detection line.

4. The liquid crystal display panel according to claim 1, wherein the first coordinate detection electrode and the second coordinate detection electrode are formed in a same layer as the pixel electrode.

5. The liquid crystal display panel according to claim 1, further comprising a signal line to supply a data signal to the thin film transistor, the second coordinate detection line being formed parallel to the signal line.

6. The liquid crystal display panel according to claim 5, wherein the second coordinate detection line is formed in a same layer as the signal line.

7. The liquid crystal display panel according to claim 1, further comprising:
   a first substrate on which the pixel electrode is formed;
   a second substrate on which the opposed electrode is formed; and
   a convex portion formed on the second substrate to face the first coordinate detection electrode and to protrude from the second substrate toward the first substrate, the convex portion electrically connecting the first coordinate detection electrode to the opposed electrode when the second substrate is pressed.

8. The liquid crystal display panel according to claim 1, further comprising:
a first substrate on which the pixel electrode is formed;
a second substrate on which the opposed electrode is formed; and
a convex portion formed on the second substrate to face the first coordinate detection electrode and the second coordinate detection electrode and to protrude from the second substrate toward the first substrate, the convex portion electrically connecting the first coordinate detection electrode and the second coordinate detection electrode to the opposed electrode when the second substrate is pressed.

9. The liquid crystal display panel according to claim 1, wherein the first coordinate detection line is formed in a same layer as the scanning line.

10. A touch panel comprising:
a pixel electrode to apply a voltage to a liquid crystal layer disposed between the pixel electrode and an opposed electrode;
a thin film transistor connected to the pixel electrode;
a scanning line to supply a gate signal to the thin film transistor;
a first coordinate detection line disposed parallel to the scanning line;
a first coordinate detection electrode formed closer to the liquid crystal layer than the first coordinate detection line, the first coordinate detection electrode being formed in a region overlapping the first coordinate detection line;
a first insulating layer formed as a layer between the first coordinate detection line and the first coordinate detection electrode, the first insulating layer being provided with a contact hole to directly electrically connect the first coordinate detection line and the first coordinate detection electrode;
a first substrate on which the pixel electrode is formed;
a second substrate on which the opposed electrode is formed;
a convex portion formed on the second substrate to face the first coordinate detection electrode and to protrude from the second substrate toward the first substrate, the convex portion electrically connecting the first coordinate detection electrode to the opposed electrode when the second substrate is pressed;
a second coordinate detection line disposed to intersect with the first coordinate detection line; and
a second coordinate detection electrode formed closer to the liquid crystal layer than the second coordinate detection line,
wherein the first insulating layer is formed as a layer between the second coordinate detection line and the second coordinate detection electrode, and is provided with a contact hole to directly electrically connect the second coordinate detection line and the second coordinate detection electrode, and
wherein the second coordinate detection electrode is formed in a region overlapping the first coordinate detection line.

11. The liquid crystal display panel according to claim 10, wherein the contact hole of the first insulating layer is formed in a region overlapping the first coordinate detection line.

12. The touch panel according to claim 10, further comprising a second insulating layer formed as a layer between the first coordinate detection line and the second coordinate detection line, the second coordinate detection line being disposed closer to the liquid crystal layer than the first coordinate detection line.

13. The touch panel according to claim 10, wherein the first coordinate detection electrode and the second coordinate detection electrode are formed in a same layer as the pixel electrode.

14. The touch panel according to claim 10, further comprising a signal line to supply a data signal to the thin film transistor, the second coordinate detection line being formed parallel to the signal line.

15. The touch panel according to claim 14, wherein the second coordinate detection line is formed in a same layer as the signal line.

16. The touch panel according to claim 14, wherein the pixel electrode has a short side parallel to the scanning line and a long side parallel to the signal line, and the first coordinate detection electrode is disposed adjacent to the second coordinate detection electrode in a direction along the short side of the pixel electrode.

17. The touch panel according to claim 10, wherein the first coordinate detection electrode and the second coordinate detection electrode are disposed adjacent to each other in a direction along the first coordinate detection line.

18. The touch panel according to claim 10, wherein the convex portion electrically connects the second coordinate detection electrode to the opposed electrode when the second substrate is pressed.

19. The touch panel according to claim 10, wherein the first coordinate detection line is formed in a same layer as the scanning line.

20. A touch panel comprising:
a pixel electrode to apply a voltage to a liquid crystal layer disposed between the pixel electrode and an opposed electrode;
a thin film transistor connected to the pixel electrode;
a scanning line to supply a gate signal to the thin film transistor;
a first coordinate detection line disposed parallel to the scanning line;
a first coordinate detection electrode formed closer to the liquid crystal layer than the first coordinate detection line, the first coordinate detection electrode being formed in a region overlapping the first coordinate detection line;
a first insulating layer formed as a layer between the first coordinate detection line and the first coordinate detection electrode, the first insulating layer being provided with a contact hole to directly electrically connect the first coordinate detection line and the first coordinate detection electrode;
a first substrate on which the pixel electrode is formed;
a second substrate on which the opposed electrode is formed;
a convex portion that is formed between the second substrate and the opposed electrode so that a region of the opposed electrode facing the first coordinate detection electrode is located closer to the first substrate than a region of the opposed electrode facing the pixel electrode;
a second coordinate detection line disposed to intersect with the first coordinate detection line; and
a second coordinate detection electrode formed closer to the liquid crystal layer than the second coordinate detection line,
wherein the first insulating layer is formed as a layer between the second coordinate detection line and the second coordinate detection electrode, and is provided with a contact hole to directly electrically connect the second coordinate detection line and the second coordinate detection electrode, wherein the convex portion is formed so that a region of the opposed electrode facing the first coordinate detection electrode and a region of the opposed electrode facing the second coordinate detection electrode are equal in distance from the first substrate, and wherein the second coordinate detection electrode is formed in a region overlapping the first coordinate detection line.

21. The liquid crystal display panel according to claim 20, wherein the contact hole of the first insulating layer is formed in a region overlapping the first coordinate detection line.

22. The touch panel according to claim 10, wherein the convex portion is covered with the opposed electrode.

* * * * *

UNITED STATES PATENT AND TRADEMARK OFFICE
CERTIFICATE OF CORRECTION

PATENT NO. : 8,624,854 B2  Page 1 of 1
APPLICATION NO. : 12/827243
DATED : January 7, 2014
INVENTOR(S) : Kazuhiro Sasaki It is certified that error appears in the above-identified patent and that said Letters Patent is hereby corrected as shown below:

In the Claims:

Column 27, Line 16, (Claim 22, Line 1), delete "claim 10" and insert --claim 20--.

Signed and Sealed this
Twenty-ninth Day of July, 2014

Michelle K. Lee
*Deputy Director of the United States Patent and Trademark Office*